US012267565B2

(12) United States Patent
Shkedi et al.

(10) Patent No.: US 12,267,565 B2
(45) Date of Patent: *Apr. 1, 2025

(54) CROSS-DEVICE ACTIONS USING COMMON IP ADDRESS DEVICE ASSOCIATION

(71) Applicant: INTENT IQ, LLC, Long Island City, NY (US)

(72) Inventors: Roy Shkedi, Forest Hills, NY (US); Dror Ben-Yishai, Tel Mond (IL)

(73) Assignee: Intent IQ, LLC, Long Island City, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/618,904

(22) Filed: Mar. 27, 2024

(65) Prior Publication Data
US 2025/0039515 A1 Jan. 30, 2025

Related U.S. Application Data

(60) Continuation of application No. 18/202,206, filed on May 25, 2023, now Pat. No. 11,949,962, which is a continuation of application No. 17/843,311, filed on Jun. 17, 2022, now Pat. No. 11,689,780, which is a continuation of application No. 17/390,211, filed on Jul. 30, 2021, now Pat. No. 11,368,763, which is a continuation of application No. 17/013,368, filed on Sep. 4, 2020, now Pat. No. 11,082,753, which is a continuation of application No. 16/556,782, filed on Aug. 30, 2019, now Pat. No. 10,771,860, which is a continuation of application No. 16/117,611, filed on Aug. 30, 2018, now Pat. No. 10,405,058, which is a continuation of application No. 15/450,361, filed on Mar. 6, 2017, now Pat. No. 10,070,200, which is a continuation of application No. 15/047,386, filed on Feb. 18, 2016, now Pat. No. 9,591,380, which is a continuation of application No. 14/790,370, filed on
(Continued)

(51) Int. Cl.
| H04N 21/81 | (2011.01) |
|---|---|
| H04N 21/258 | (2011.01) |
| H04N 21/2668 | (2011.01) |
| H04N 21/41 | (2011.01) |
| H04N 21/426 | (2011.01) |
| H04N 21/435 | (2011.01) |
| H04N 21/436 | (2011.01) |
| H04N 21/442 | (2011.01) |
| H04N 21/45 | (2011.01) |
| H04N 21/488 | (2011.01) |
| H04N 21/61 | (2011.01) |
| H04N 21/6402 | (2011.01) |
| H04N 21/643 | (2011.01) |
| H04N 21/84 | (2011.01) |

(52) U.S. Cl.
CPC ..... *H04N 21/812* (2013.01); *H04N 21/25841* (2013.01); *H04N 21/25891* (2013.01); *H04N 21/2668* (2013.01); *H04N 21/4104* (2013.01); *H04N 21/4108* (2013.01); *H04N 21/4112* (2020.08); *H04N 21/4126* (2013.01); *H04N 21/42684* (2013.01); *H04N 21/435* (2013.01); *H04N 21/43615* (2013.01); *H04N 21/44222* (2013.01); *H04N 21/44224* (2020.08); *H04N 21/4524* (2013.01); *H04N 21/4532* (2013.01); *H04N 21/6125* (2013.01); *H04N 21/6402* (2013.01); *H04N 21/64322* (2013.01); *H04N 21/84* (2013.01); *H04N 21/4882* (2013.01)

(58) Field of Classification Search
None
See application file for complete search history.

(56) References Cited

U.S. PATENT DOCUMENTS

| 5,636,346 A | 6/1997 | Saxe |
| 5,809,242 A | 9/1998 | Shaw et al. |

(Continued)

FOREIGN PATENT DOCUMENTS

| JP | 2008-217177 | 9/2008 |
| KR | 10-0793513 | 1/2008 |

(Continued)

OTHER PUBLICATIONS

*AlmondNet, Inc. et al v. Freewheel Media, Inc. et al* 1-24-cv-01259 (D. Del.) (complaint filed Nov. 15, 2024 alleging infringement of, inter alia, U.S. Pat. No. 11,949,962).

(Continued)

*Primary Examiner* — Fernando Alcon
(74) *Attorney, Agent, or Firm* — Louis J. Hoffman; David S. Alavi

(57) ABSTRACT

A profile provider: (i) associates a primary online device (OD1) with a set-top box (STB); (ii) a location of OD1 at some point in time is estimated to be "near" the STB, thereby establishing a STB proxy location; (iii) one or more secondary online devices (OD2s) are observed to be located "near" the STB proxy location and are associated with the STB; and (iv) a television advertisement is selected to be directed to the STB, which selection is based at least in part on profile information linked to one of the associated OD2s. The method can be particularly advantageous in situations wherein: the STB is not connected to any computer network; the STB is not ever connected to the same local area network as OD1 or OD2; or television service (used by the STB) and online access (used by OD1 and OD2s) are provided by different service providers.

26 Claims, No Drawings

Related U.S. Application Data

Jul. 2, 2015, now Pat. No. 9,271,024, which is a continuation of application No. 14/196,844, filed on Mar. 4, 2014, now Pat. No. 9,078,035, which is a division of application No. 13/566,881, filed on Aug. 3, 2012, now Pat. No. 8,683,502.

(60) Provisional application No. 61/514,840, filed on Aug. 3, 2011.

(56) References Cited

U.S. PATENT DOCUMENTS

| | | |
|---|---|---|
| 5,835,896 A | 11/1998 | Fisher et al. |
| 5,848,396 A | 12/1998 | Gerace |
| 5,855,008 A | 12/1998 | Goldhaber et al. |
| 5,933,811 A | 8/1999 | Angles et al. |
| 5,948,061 A | 9/1999 | Merriman |
| 6,034,689 A | 3/2000 | White et al. |
| 6,160,989 A | 12/2000 | Hendricks et al. |
| 6,216,129 B1 | 4/2001 | Eldering |
| 6,366,298 B1 | 4/2002 | Haitsuka et al. |
| 6,377,986 B1 | 4/2002 | Philyaw et al. |
| 6,385,592 B1 | 5/2002 | Angles et al. |
| 6,446,261 B1 | 9/2002 | Rosser |
| 6,427,170 B1 | 12/2002 | Sitaraman et al. |
| 6,536,041 B1 | 3/2003 | Knudson et al. |
| 6,684,194 B1 | 1/2004 | Eldering et al. |
| 6,718,551 B1 | 4/2004 | Swix et al. |
| 6,771,290 B1 | 8/2004 | Hoyle |
| 6,832,207 B1 | 12/2004 | Shkedi |
| 6,845,396 B1 | 1/2005 | Kanojia |
| 6,868,392 B1 | 3/2005 | Ogasawara |
| 6,915,271 B1 | 7/2005 | Meyer et al. |
| 6,925,440 B1 | 8/2005 | Shkedi |
| 6,973,436 B1 | 12/2005 | Shkedi |
| 7,039,935 B2 | 5/2006 | Knudson et al. |
| 7,051,351 B2 | 5/2006 | Goldman et al. |
| 7,072,853 B2 | 7/2006 | Shkedi |
| 7,092,926 B2 | 8/2006 | Cerrato |
| 7,100,183 B2 | 8/2006 | Kunkel et al. |
| 7,152,237 B2 | 12/2006 | Flickinger et al. |
| 7,251,628 B1 | 7/2007 | Edlund et al. |
| 7,260,823 B2 | 8/2007 | Schlack et al. |
| 7,328,448 B2 | 2/2008 | Eldering et al. |
| 7,328,450 B2 | 2/2008 | Macrae et al. |
| 7,356,045 B2 | 4/2008 | Satapati et al. |
| 7,370,073 B2 | 5/2008 | Yen et al. |
| 7,370,342 B2 | 5/2008 | Ismail et al. |
| 7,376,714 B1 | 5/2008 | Gerken |
| 7,428,493 B2 | 9/2008 | Shkedi |
| 7,454,364 B2 | 11/2008 | Shkedi |
| 7,486,648 B1 | 2/2009 | Baranowski |
| 7,490,135 B2 | 2/2009 | Klug et al. |
| 7,634,785 B2 | 12/2009 | Smith |
| 7,636,672 B2 | 12/2009 | Angles et al. |
| 7,730,030 B1 | 6/2010 | Xu |
| 7,739,140 B2 | 6/2010 | Vinson et al. |
| 7,747,745 B2 | 6/2010 | Shkedi |
| 7,818,206 B2 | 10/2010 | Smith et al. |
| 7,818,763 B2 | 10/2010 | Sie et al. |
| 7,822,637 B2 | 10/2010 | Shkedi |
| 7,822,639 B2 | 10/2010 | Shkedi |
| 7,840,689 B2 | 11/2010 | Stewart |
| 7,843,923 B2 | 11/2010 | Baum |
| 7,844,985 B2 | 11/2010 | Hendricks et al. |
| 7,856,372 B2 | 12/2010 | Ullah |
| 7,856,373 B2 | 12/2010 | Ullah |
| 7,861,260 B2 | 12/2010 | Shkedi |
| 7,890,609 B2 | 2/2011 | Shkedi |
| 7,899,862 B2 | 3/2011 | Appelman et al. |
| 7,899,915 B2 | 3/2011 | Reisman |
| 7,900,229 B2 | 3/2011 | Dureau |
| 7,925,549 B2 | 4/2011 | Looney et al. |
| 7,937,383 B2 | 5/2011 | Hintze et al. |
| 7,941,817 B2 | 5/2011 | Khusheim |
| 7,958,224 B2 | 6/2011 | Amjadi |
| 7,979,307 B2 | 7/2011 | Shkedi |
| 7,987,491 B2 | 7/2011 | Reisman |
| 8,015,286 B2 | 9/2011 | Jenkins |
| 8,024,454 B2 | 9/2011 | Campbell et al. |
| 8,024,765 B2 | 9/2011 | Ramanathan et al. |
| 8,051,444 B2 | 11/2011 | Shkedi |
| 8,086,491 B1 | 12/2011 | Matz et al. |
| 8,108,895 B2 | 1/2012 | Anderson et al. |
| 8,131,271 B2 | 3/2012 | Ramer et al. |
| 8,132,202 B2 | 3/2012 | Swix et al. |
| 8,132,208 B2 | 3/2012 | Gonzalez |
| 8,150,732 B2 | 4/2012 | Beyda et al. |
| 8,166,501 B2 | 4/2012 | Shikuma et al. |
| 8,180,674 B2 | 5/2012 | Madhavan et al. |
| 8,200,822 B1 | 6/2012 | Shkedi |
| 8,204,783 B2 | 6/2012 | Shkedi |
| 8,204,965 B2 | 6/2012 | Shkedi |
| 8,213,426 B2 | 7/2012 | Zampiello |
| 8,239,264 B2 | 8/2012 | Shkedi |
| 8,239,886 B2 | 8/2012 | Savoor et al. |
| 8,244,574 B2 | 8/2012 | Shkedi |
| 8,244,582 B2 | 8/2012 | Shkedi |
| 8,244,583 B2 | 8/2012 | Shkedi |
| 8,244,586 B2 | 8/2012 | Shkedi |
| 8,280,758 B2 | 10/2012 | Shkedi |
| 8,281,336 B2 | 10/2012 | Shkedi |
| 8,341,247 B2 | 12/2012 | Shkedi |
| 8,494,904 B2 | 7/2013 | Shkedi |
| 8,522,271 B2 | 8/2013 | Childress et al. |
| 8,566,154 B2 | 10/2013 | Merriman et al. |
| 8,566,164 B2 | 10/2013 | Shkedi |
| 8,589,210 B2 | 11/2013 | Shkedi |
| 8,595,069 B2 | 11/2013 | Shkedi |
| 8,600,815 B2 | 12/2013 | Shkedi |
| 8,607,267 B2 | 12/2013 | Shkedi |
| 8,671,139 B2 | 3/2014 | Shkedi |
| 8,677,398 B2 | 3/2014 | Shkedi |
| 8,695,032 B2 | 4/2014 | Shkedi |
| 8,713,600 B2 | 4/2014 | Shkedi |
| 8,775,249 B2 | 7/2014 | Shkedi |
| 8,959,146 B2 | 2/2015 | Shkedi |
| 8,997,138 B2 | 3/2015 | Shkedi |
| 9,071,886 B2 | 6/2015 | Shkedi |
| 9,083,853 B2 | 7/2015 | Shkedi |
| 9,131,282 B2 | 9/2015 | Shkedi |
| 9,208,514 B2 | 12/2015 | Shkedi |
| 9,226,019 B2 | 12/2015 | Shkedi |
| 9,351,053 B2 | 5/2016 | Shkedi |
| 9,369,779 B2 | 6/2016 | Shkedi |
| 9,495,682 B2 | 11/2016 | Vallier et al. |
| 9,508,089 B2 | 11/2016 | Shkedi |
| 9,571,865 B2 | 2/2017 | Shkedi |
| 9,756,372 B2 | 9/2017 | Shkedi |
| 9,800,917 B2 | 10/2017 | Shkedi |
| 9,813,778 B2 | 11/2017 | Shkedi |
| 9,830,615 B2 | 11/2017 | Shkedi |
| 10,009,636 B2 | 6/2018 | Shkedi |
| 10,026,100 B2 | 7/2018 | Shkedi |
| 10,134,054 B2 | 11/2018 | Shkedi |
| 10,178,442 B2 | 1/2019 | Shkedi |
| 10,306,282 B2 | 5/2019 | Shkedi |
| 10,321,198 B2 | 6/2019 | Shkedi |
| 10,475,073 B2 | 10/2019 | Shkedi |
| 10,628,857 B2 | 4/2020 | Shkedi |
| 10,645,438 B2 | 5/2020 | Shkedi |
| 10,715,878 B2 | 7/2020 | Shkedi |
| 10,771,860 B2 | 9/2020 | Shkedi et al. |
| 10,834,438 B2 | 11/2020 | Shkedi |
| 10,839,423 B2 | 11/2020 | Shkedi |
| 10,984,445 B2 | 4/2021 | Shkedi |
| 11,082,753 B2 | 8/2021 | Shkedi et al. |
| 11,093,970 B2 | 8/2021 | Shkedi |
| 11,095,952 B2 | 8/2021 | Shkedi et al. |
| 11,282,105 B1 | 3/2022 | Shkedi et al. |
| 11,368,763 B2 | 3/2022 | Shkedi et al. |
| 11,301,898 B2 | 4/2022 | Shkedi |
| 11,303,973 B2 | 4/2022 | Shkedi |
| 11,350,174 B1 * | 5/2022 | Zhou .................. H04N 21/4667 |

(56) References Cited

U.S. PATENT DOCUMENTS

| | | |
|---|---|---|
| 11,503,348 B2 | 11/2022 | Shkedi |
| 11,564,015 B2 | 1/2023 | Shkedi |
| 11,589,136 B2 | 2/2023 | Shkedi |
| 11,610,226 B2 | 3/2023 | Shkedi |
| 11,689,780 B2 | 6/2023 | Shkedi et al. |
| 11,778,249 B2 | 10/2023 | Shkedi |
| 11,805,300 B2 | 10/2023 | Shkedi |
| 11,831,964 B2 | 11/2023 | Shkedi et al. |
| 11,836,759 B2 | 12/2023 | Shkedi |
| 11,949,962 B2 | 4/2024 | Shkedi et al. |
| 11,974,025 B2 | 4/2024 | Shkedi |
| 12,063,421 B1 | 8/2024 | Shkedi |
| 2001/0003184 A1 | 6/2001 | Ching et al. |
| 2002/0013943 A1 | 1/2002 | Haberman et al. |
| 2002/0032603 A1 | 3/2002 | Yeiser |
| 2002/0056088 A1 | 5/2002 | Silva, Jr. et al. |
| 2002/0078444 A1 | 6/2002 | Krewin et al. |
| 2002/0082910 A1 | 6/2002 | Kontogouris |
| 2002/0123928 A1 | 9/2002 | Eldering et al. |
| 2002/0124249 A1 | 9/2002 | Shintani |
| 2002/0124253 A1 | 9/2002 | Eyer et al. |
| 2002/0129362 A1 | 9/2002 | Chang et al. |
| 2002/0144281 A1 | 10/2002 | Taguchi |
| 2002/0166119 A1 | 11/2002 | Cristofalo |
| 2002/0194058 A1 | 12/2002 | Eldering |
| 2002/0194604 A1 | 12/2002 | Sanchez et al. |
| 2003/0051242 A1 | 3/2003 | Donnelly |
| 2003/0066078 A1 | 4/2003 | Bjorgan et al. |
| 2003/0093792 A1 | 5/2003 | Labeeb et al. |
| 2003/0149975 A1 | 8/2003 | Eldering et al. |
| 2003/0208758 A1 | 11/2003 | Schein et al. |
| 2004/0068744 A1 | 4/2004 | Claussen et al. |
| 2004/0073915 A1* | 4/2004 | Dureau ............... H04H 60/91 348/E7.071 |
| 2004/0078809 A1 | 4/2004 | Drazin |
| 2004/0107437 A1 | 6/2004 | Reichardt et al. |
| 2004/0117827 A1 | 6/2004 | Karaoguz et al. |
| 2004/0128547 A1 | 7/2004 | Laidlaw et al. |
| 2004/0172650 A1 | 9/2004 | Hawkins et al. |
| 2005/0032529 A1 | 2/2005 | Akama |
| 2005/0055713 A1 | 3/2005 | Lee et al. |
| 2005/0086112 A1 | 4/2005 | Shkedi |
| 2005/0096978 A1 | 5/2005 | Black |
| 2005/0096980 A1 | 5/2005 | Koningstein |
| 2005/0108091 A1 | 5/2005 | Sotak et al. |
| 2005/0108776 A1 | 5/2005 | Carver et al. |
| 2005/0125290 A1 | 6/2005 | Beyda et al. |
| 2005/0160002 A1 | 7/2005 | Roetter et al. |
| 2005/0165638 A1 | 7/2005 | Piller |
| 2005/0165643 A1 | 7/2005 | Wilson et al. |
| 2005/0165644 A1 | 7/2005 | Beyda et al. |
| 2005/0187823 A1 | 8/2005 | Howes |
| 2005/0246736 A1 | 11/2005 | Beyda et al. |
| 2005/0278731 A1 | 12/2005 | Cameron et al. |
| 2005/0283796 A1 | 12/2005 | Flickinger |
| 2006/0123080 A1 | 6/2006 | Baudino et al. |
| 2006/0123081 A1 | 6/2006 | Baudino et al. |
| 2006/0128364 A1 | 6/2006 | Costa-Requena et al. |
| 2006/0205354 A1 | 9/2006 | Pirzada et al. |
| 2006/0248570 A1 | 11/2006 | Witwer |
| 2006/0253323 A1 | 11/2006 | Phan et al. |
| 2006/0265507 A1 | 11/2006 | Banga et al. |
| 2006/0271953 A1 | 11/2006 | Jacoby et al. |
| 2006/0287916 A1 | 12/2006 | Starr et al. |
| 2007/0038516 A1 | 2/2007 | Apple et al. |
| 2007/0061838 A1 | 3/2007 | Grubbs et al. |
| 2007/0067459 A1 | 3/2007 | Baal-Haness |
| 2007/0073585 A1 | 3/2007 | Apple et al. |
| 2007/0089127 A1 | 4/2007 | Flickinger et al. |
| 2007/0100690 A1 | 5/2007 | Hopkins |
| 2007/0118661 A1 | 5/2007 | Vishwanathan et al. |
| 2007/0130015 A1 | 6/2007 | Starr et al. |
| 2007/0157247 A1 | 7/2007 | Cordray et al. |
| 2007/0180469 A1 | 8/2007 | Finley et al. |
| 2007/0198532 A1 | 8/2007 | Krikorian et al. |
| 2007/0208619 A1 | 9/2007 | Branam et al. |
| 2007/0217436 A1 | 9/2007 | Markley et al. |
| 2007/0220553 A1 | 9/2007 | Branam |
| 2007/0266400 A1 | 11/2007 | Rogers et al. |
| 2007/0266403 A1 | 11/2007 | Ou et al. |
| 2007/0283384 A1 | 12/2007 | Haeuser et al. |
| 2007/0294721 A1 | 12/2007 | Haeuser et al. |
| 2008/0040742 A1 | 2/2008 | Howcroft et al. |
| 2008/0065235 A1 | 3/2008 | Igoe et al. |
| 2008/0109306 A1 | 5/2008 | Maigret et al. |
| 2008/0109376 A1 | 5/2008 | Walsh et al. |
| 2008/0109843 A1* | 5/2008 | Ullah ................. H04N 21/812 725/34 |
| 2008/0113674 A1 | 5/2008 | Baig |
| 2008/0118063 A1 | 5/2008 | Guzman et al. |
| 2008/0120178 A1 | 5/2008 | Martinez et al. |
| 2008/0189360 A1 | 8/2008 | Kiley et al. |
| 2008/0201731 A1 | 8/2008 | Howcroft |
| 2008/0222283 A1 | 9/2008 | Ertugrul et al. |
| 2008/0244076 A1 | 10/2008 | Shah et al. |
| 2008/0255944 A1 | 10/2008 | Shah et al. |
| 2008/0262901 A1 | 10/2008 | Banga et al. |
| 2008/0275785 A1 | 11/2008 | Altberg et al. |
| 2008/0281697 A1 | 11/2008 | Whitehead |
| 2008/0281699 A1 | 11/2008 | Whitehead |
| 2008/0300985 A1 | 12/2008 | Shamp et al. |
| 2009/0007171 A1 | 1/2009 | Casey et al. |
| 2009/0037949 A1 | 2/2009 | Birch |
| 2009/0044246 A1 | 2/2009 | Sheehan et al. |
| 2009/0049468 A1 | 2/2009 | Shkedi |
| 2009/0049469 A1 | 2/2009 | Small et al. |
| 2009/0106100 A1 | 4/2009 | Mashinsky |
| 2009/0119151 A1 | 5/2009 | de Heer |
| 2009/0171780 A1 | 7/2009 | Aldrey et al. |
| 2009/0172723 A1 | 7/2009 | Shkedi et al. |
| 2009/0199230 A1 | 8/2009 | Kumar et al. |
| 2009/0204706 A1 | 8/2009 | Ertugrul et al. |
| 2009/0217324 A1 | 8/2009 | Massimi |
| 2009/0299843 A1* | 12/2009 | Shkedi .................. H04N 21/47 705/14.39 |
| 2009/0299857 A1 | 12/2009 | Brubaker |
| 2010/0058383 A1 | 3/2010 | Chang et al. |
| 2010/0076848 A1 | 3/2010 | Stefanik et al. |
| 2010/0175078 A1 | 7/2010 | Knudson et al. |
| 2010/0287048 A1 | 11/2010 | Ramer |
| 2010/0333131 A1 | 12/2010 | Parker et al. |
| 2011/0010734 A1 | 1/2011 | Newell |
| 2011/0035256 A1 | 2/2011 | Shkedi et al. |
| 2011/0040607 A1 | 2/2011 | Shkedi |
| 2011/0167043 A1 | 7/2011 | Hintze et al. |
| 2011/0258049 A1 | 10/2011 | Ramer et al. |
| 2012/0023522 A1 | 1/2012 | Anderson et al. |
| 2012/0084828 A1 | 4/2012 | Rowe et al. |
| 2012/0149309 A1 | 6/2012 | Hubner et al. |
| 2014/0137149 A1 | 5/2014 | Liu |
| 2016/0337697 A1* | 11/2016 | Yazdani ........... H04N 21/44008 |
| 2019/0208247 A1* | 7/2019 | Anguiano .......... H04N 21/4532 |

FOREIGN PATENT DOCUMENTS

| | | |
|---|---|---|
| KR | 10-2009-0113456 | 8/2012 |
| WO | WO 02/19720 | 3/2002 |
| WO | WO 2005/046237 | 5/2005 |

OTHER PUBLICATIONS

Battelle, John; "The Search—How Google and Its Rivals Rewrote the Rules of Business and Transformed Our Culture"; pp. 167-171; 2005.

"BSkyB in Google Link-up"; Financial Times (FT.com); Dec. 6, 2006.

"Cable's Big Bet On Hyper-Targeting. Time Warner will test new software that sends different ads to different viewers."; BusinessWire online; Jul. 4, 2005.

Chen, Andy; "The New Behavioral Wunder"; from webpage http://www.clickz.com; Apr. 11, 2007.

(56) References Cited

OTHER PUBLICATIONS

"Google moves into TV ads with BSkyB Deal"; Guardian Unlimited; Dec. 7, 2006.
Keegan, Paul; "The Man Who Can Save Advertising"; from http://money.cnn.com; Nov. 1, 2004.
Shukla, Anuradha; "Visible World Offers 'Any Screen' Solution for Customized Video Advertising"; from www.tmcnet.com; Feb. 6, 2007.
Story, Louise; "The Web drives an advertising boom without the need for agencies"; International Herald Tribune (iht.com); Feb. 8, 2007.
"This Ad's for You—Just You"; BusinessWeek online; Jun. 28, 2005.
"TiVo Launches New Interactive Advertising Technology"; press release from www.tivo.com; Jul. 18, 2005.
"TiVo Announces First Advertising Search Product for Television"; press release from www.tivo.com; Nov. 28, 2005.
"TiVo Begins Rollout of Online Services Now Accessible Directly on the TV"; press release from www.tivo.com; Dec. 1, 2005.
"TiVo Launches Television's New Advertising Search Product"; press release from www.tivo.com; May 8, 2006.
"Venture Market Summary"; VentureWire Alert; Mar. 29, 2005.
"Visible World Targets Advertising Industry"; from http://informitv.com; Feb. 20, 2005.
Zwicky, Building Internet Firewalls (2d ed. 2000); Chapter 5.
Hahn, The Internet Complete Reference (2d ed. 1996); Chapters 10, 25, 26.
P. Srisuresh et al., Request for Comments (RFC) 2663, IP Network Translator (NAT) Terminology and Considerations, Aug. 1999 ("RFC 2663").
Peter Fletcher et al., Practical Web Traffic Analysis: Standard, Privacy, Techniques, Results (2002); Intro, Chapters 1 and 3.
Request for Comments (RFC) 793, Transmission Control Protocol, DARPA Internet Program Protocol Specification, Sep. 1981 ("RFC 793").
Microsoft Computer Dictionary (5th ed. 2002) (re: "redirection").
U.S. Appl. No. 18/647,861, filed Apr. 26, 2024, Apr. 17, 2007.
U.S. Appl. No. 18/799,978, filed Aug. 9, 2024, Jan. 30, 2013.
U.S. Appl. No. 18/384,836, filed Oct. 28, 2023, Jun. 16, 2006 (prov.).
U.S. Appl. No. 17/401,052, filed Aug. 12, 2021, Jun. 19, 2006 (prov.).
U.S. Appl. No. 18/800,005, filed Aug. 9, 2024, Dec. 31, 2007.

\* cited by examiner

CROSS-DEVICE ACTIONS USING COMMON IP ADDRESS DEVICE ASSOCIATION

CROSS-REFERENCE TO RELATED APPLICATIONS

This application is a continuation of application Ser. No. 18/202,206 filed on May 25, 2023, now U.S. Pat. No. 11,949,962, which is a continuation of application Ser. No. 17/843,311 filed on Jun. 17, 2022, now U.S. Pat. No. 11,689,780, which is a continuation of application Ser. No. 17/390,211 filed on Jul. 30, 2021, now U.S. Pat. No. 11,368,763, which is a continuation of Ser. No. 17/013,368, filed Sep. 4, 2020, now U.S. Pat. No. 11,082,753, which is a continuation of application Ser. No. 16/556,782, filed Aug. 30, 2019, now U.S. Pat. No. 10,771,860, which is a continuation of application Ser. No. 16/117,611, filed Aug. 30, 2018, now U.S. Pat. No. 10,405,058, which is a continuation of application Ser. No. 15/450,361, filed Mar. 6, 2017, now U.S. Pat. No. 10,070,200, which is a continuation of application Ser. No. 15/047,386, filed Feb. 18, 2016, now U.S. Pat. No. 9,591,380, which is a continuation of application Ser. No. 14/790,370, filed Jul. 2, 2015, now U.S. Pat. No. 9,271,024, which is a continuation of application Ser. No. 14/196,844, filed Mar. 4, 2014, now U.S. Pat. No. 9,078,035, which is a division of application Ser. No. 13/566,881, filed Aug. 3, 2012, now U.S. Pat. No. 8,683,502, which claims benefit of provisional application Ser. No. 61/514,840 filed Aug. 3, 2011, which provisional application is hereby incorporated by reference as if fully set forth herein.

BACKGROUND

The field of the present invention relates to correlating or targeting actions or activities pertaining to online devices (such as desktop computers, portable computers, tablets, mobile phones or smartphones; referred to herein as ODs) and set-top boxes (referred to herein as STBs). In particular, methods are disclosed whereby television advertising delivered to a specific set-top box can be targeted based on user profile information arising from multiple online devices, only one of which needs to be directly associated with the set-top box.

Systems or methods disclosed herein may be related to subject matter disclosed in:

U.S. non-provisional application Ser. No. 09/593,993 filed Jun. 14, 2000 (now U.S. Pat. No. 6,925,440);
U.S. non-provisional application Ser. No. 11/099,861 filed Apr. 6, 2005 (now U.S. Pat. No. 7,428,493);
U.S. non-provisional application Ser. No. 11/736,544 filed Apr. 17, 2007 (now U.S. Pat. No. 7,861,260);
U.S. non-provisional application Ser. No. 11/968,117 filed Dec. 31, 2007 (U.S. Patent Pub. 2009/0172728 A1);
U.S. non-provisional application Ser. No. 12/131,798 filed Jun. 2, 2008 (U.S. Patent Pub. 2009/0300675 A1);
U.S. non-provisional application Ser. No. 12/131,824 filed Jun. 2, 2008 (U.S. Patent Pub. 2009/0299843 A1);
U.S. non-provisional application Ser. No. 12/186,918 filed Aug. 6, 2008 (U.S. Patent Pub. 2008/0313194 A1);
U.S. non-provisional application Ser. No. 12/257,386 filed Oct. 23, 2008 (U.S. Patent Pub. 2009/0049468 A1);
U.S. non-provisional application Ser. No. 12/688,731 filed Jan. 15, 2010 (now U.S. Pat. No. 7,890,609);
U.S. non-provisional application Ser. No. 12/860,666 filed Aug. 20, 2010 (U.S. Patent Pub. 2010/0325659 A1);
U.S. non-provisional application Ser. No. 12/906,007 filed Oct. 15, 2010 (not yet published);
U.S. provisional App. Ser. No. 61/393,834 filed Oct. 15, 2010; and
U.S. non-provisional application Ser. No. 12/981,925 filed Dec. 30, 2010 (U.S. Patent Pub. 2011/0099576 A1).

Each of the above-listed applications and publications is hereby incorporated by reference. Although the applications listed use similar terminology, there are some differences between terminology used in those applications and that used in the present disclosure. The definitions or descriptions set forth in the present disclosure shall apply herein if inconsistent.

Some of the terms used in the present disclosure are defined as follows.

Television provider (TVP)—an entity that provides television service to a subscriber or user via any suitable transmission medium, including but not limited to coaxial cable, fiber-optical cable, network cable, phone line, satellite transmission, cellular transmission, 3G transmission, 4G transmission, WiMax transmission, WiFi transmission, other IEEE 802 transmission, or VHF or UHF transmission. As is common in the art, in some contexts, reference to a TVP may refer to the computer systems or other equipment controlled by the entity rather than the entity itself.

Internet service provider (ISP; equivalently, an online access provider)—an entity that provides online access to a subscriber or user via any suitable transmission medium, including but not limited to coaxial cable, fiber-optical cable, network cable, phone line, satellite transmission, wireless transmission (e.g., 3G, 4G, WiMax, WiFi, or other IEEE 802 wireless protocols), or VHF or UHF transmission. The online access enables the subscriber to access the Internet and its myriad online sites, or to access any future network successor to the Internet. As is common in the art, in some contexts, reference to an ISP may refer to the computer systems or other equipment controlled by the entity rather than the entity itself.

ISP/TVP—in some instances a single entity (or providers controlled by a single entity) can provide to one or more subscribers or users both television service and online access. Such an entity is referred to herein as an ISP/TVP. Although an ISP and a TVP may be represented schematically in the drawings by separate labeled boxes, the drawings are intended to encompass instances in which the ISP and the TVP are independent entities as well as other instances in which a common ISP/TVP provides both services.

Set-top box (STB)—a device that connects a television and a signal source. As is recognized by those of skill in the art, a "television" is any device known in the art or developed hereafter that is capable of presenting television content to a viewer or user, e.g., a CRT or flat panel television set, a home theater system, a computer monitor, a tablet computing device, or a mobile phone or other handheld device. Some examples of STBs include cable boxes (often combined with personal video recorders), online-coupled gaming machines, appropriately configured computer systems that can drive a computer monitor, or modules of a mobile phone system allowing content presentation. The STB receives an incoming signal, extracts content from the received signal, and transmits the extracted content to the television to be presented to a viewer.

The signal source can be one or more of a computer network cable (e.g., an Ethernet or other transmission-speed cable), a satellite dish, a coaxial cable connected to a cable television system, a telephone line or digital subscriber line (DSL), a wireless network connection (e.g., via a cellular telephone network, WiFi, or other wireless connection), an antenna (VHF, UHF, digital, or other), or another suitable signal source. The content can include, but is not limited to, video (which often can include an audio portion), audio, Internet web pages, interactive games, or other content. An STB may or may not include a dedicated television tuner.

Despite its name, an STB need not be physically located on top of a television set literally. Under current technology, STBs often are located physically adjacent to the television set, such as in a media cabinet or the like, but it is not even necessary that the STB be located in proximity to the television. Nor is it necessary that the STB be a box, literally. Rather, a STB might be implemented, for example, as a circuit board, integrated circuit, set of integrated circuits, or software that is physically integrated with another "box," such as the television, a cable or other connection, a computer, a mobile phone, or a building equipment or junction box, which also has other functions, or without being housed in any "box" at all.

Online user interface device (equivalently, online device or OD)—any piece of computerized equipment used to access a remote network such as the Internet at least intermittently, including but not limited to a smart phone or mobile handset, a personal digital assistant (PDA), a game console, or a networked computer (desktop, workstation, notebook, laptop, or other).

Online access device—any piece of equipment used to connect an online user interface device to a remote network such as the Internet, including but not limited to a modem, a wired or wireless router, a wireless access point, a wired network adapter (e.g., Ethernet adapter), a wireless network adapter (e.g., WiFi, other IEEE 802.11, WiMax, ED-VO, EDGE, HSPA, CDMA, GSM, or other), or an optical fiber based network adapter (e.g., a network interface unit or optical network terminal). Different types of online access devices can be and sometimes are combined into a single unit (e.g., a modem that also functions as a router for a LAN). An online user interface device and an online access device can be, and sometimes are, combined into a single unit (e.g., a computer with a built-in Ethernet adapter, wireless adapter, or modem, or a mobile phone that can be used for online access).

Each online access device typically is identified on the Internet by an Internet Protocol address (i.e., an IP address; currently, under IPv4, an IP address comprises a sequence of four numbers each ranging from 0 to 255, i.e., a 32-bit address; under IPv6, an IP address comprises a 128-bit address; other, future-developed IP address protocols shall fall within the scope of the present disclosure or appended claims). Every transmission of data over the Internet includes a destination IP address to enable the transmitted data to reach its intended destination. In some instances an online access device has a static IP address, while in other, more common instances an online access device has an IP address that is dynamic and changes from time to time. Although IP addresses are referred to herein for enabling data transmitted via the Internet to reach its intended destination, that terminology is intended to encompass any functionally equivalent online access device identifier employed to route such transmitted data to its intended destination through the Internet or through any future successor network.

Device Identifier (e.g., online device identifier or set-top box identifier)—An online device or set-top box typically is indicated by one or more device identifiers. Such an identifier can be of any suitable type; examples can include: an IP address assigned according to any suitable IP address protocol; a tag or cookie placed or recognized on the device; an identifier assigned by a provider of service via the device or manufacturer of all or part of the device. Examples of the latter can include, e.g.: a STB identifier assigned by a TVP; a modem or router identifier assigned by an ISP; a MAC address or serial number assigned by a device manufacturer; or a smartphone identifier such as a mobile phone number (MSISDN), service-subscriber key (IMSI or SIM identifier), Electronic Serial Number (ESN), Mobile Equipment Identifier (MEID), or International Mobile Equipment Identity (IMEI). The device identifier can in some instances be a pseudonym assigned to the device and used as a proxy for an actual device identifier. A device identifier can be stored locally on the device, can be stored remotely on a server of any interested party, or can be stored both locally and remotely. Different identifiers of the same device can be linked in a database, typically on a remote server, or in cookies or tags place on the device.

Device Fingerprint—An online device or a set-top box can in some instances be identified uniquely by a combination of parameters characterizing the device or software installed on the device. Such a parameter combination can be referred to as a device "fingerprint" and can be employed as a device identifier. Examples of parameters typically employed in a device fingerprint can include one or more of: an IP address, device configuration or hardware, device display type or resolution, operating system software, browser software, browser plug-in or add-on software, other installed software, user-selected font(s), user-selected language(s), time zone, or geographic location. Any operating system or software can be specified by program identity as well as by program version.

Router—any piece of equipment that acts as a junction between networks, to buffer and transfer data between or among them. For example, a router can be employed to connect a local area network (LAN) to the Internet, thereby enabling online user interface devices connected to the LAN to share a connection to the Internet through the router. The router receives data from devices on the LAN and transmits the data to the Internet, directed to the various destinations, and receives data from the Internet and directs the data to the corresponding devices on the LAN.

Modem—a piece of equipment that enables online access by a user by acting as an interface between the online access provider's network transmission system and the user's computer or other online user interface device. Modems vary according to the type of provider network transmission system. Unless a specific type of modem is specified, the term "modem" shall encompass telephone modems, cable modems, DSL modems, wireless modems, satellite modems, or modems for providing online access to any other suitable network transmission system.

User (equivalently, subscriber, viewer)—the term "user" shall be construed as what is thought to be an individual person receiving online access or television service at a delivery end-point, which is typically located within a household, office, business, or other site or establishment served by an online access provider or TVP. A single household, office, business, or other location often has multiple users. In some instances, a business having multiple physical locations may be served by separate online or television services, but in other instances, a business may have an internal LAN or WAN that extends service provided to multiple physical locations. Also, some online user interface devices and televisions are portable and can access the service from remote locations. Accordingly, the term "user" does not require a fixed or single location in such instances. Reference to a "user" in some contexts actually refers to computer-controlled activity (monitoring, advertisement delivery, etc.) done in connection with a device (e.g., television, phone, laptop, or fixed-location computer) thought to be operated by the individual person called the "user." However, it is understood that a given device might be operated by multiple persons, such as different members of a household or business, at different times. Accordingly, as is common in the art, in some contexts, reference to a "user" may refer to the computer, device, or other equipment rather than the person.

Behavioral targeting—the delivery of specific advertisements to a user, the advertisements being selected on the basis of activity of the user, typically recent activity, including but not limited to: online or television-based searches conducted by the user; content viewed or otherwise accessed by the user online or on television; online or television advertisements viewed, clicked on, interacted with, or otherwise accessed by the user; shopping or purchases made by the user online or through a television; and any other form of previous user online or television activity.

Central Ad Server (CAS)—a computer server (equipment) that manages delivery of advertisements (television or online). A local ad server can be typically run by a single publisher to serve ads to visitors of one or more websites or viewers of television programs of that publisher, or by a single advertiser to serve ads into ad space acquired by the advertiser on various websites or television programs. A third-party or remote ad server typically is remotely located and delivers advertisements of various advertisers to visitors of websites or viewers of programs of multiple publishers. The remote ad server acts as a central conduit for delivering advertisements, enabling advertisers and publishers to track the distribution of their online or television advertisements and to control the rotation and distribution of their advertisements across the Internet or television system from one location. Either a local or a remote ad server can be considered a CAS. The advertisements can be stored on the CAS for later delivery, can be transmitted to the CAS and then delivered from the CAS upon receiving an ad request, or can be delivered from another source in response to an ad request received and routed by the CAS. Examples of third-party ad servers include DoubleClick's DART for Publishers central ad server (also known as DFP) and DoubleClick's DART for Advertisers central ad server (also known as DFA). In some cases, a CAS can be owned or used by a TVP, an ISP, an STB provider or modem provider, an online content provider, a profile aggregator, a profile distributor, an ad broker, an ad network, an ad exchange, an ad agency, an online advertiser, a TV advertiser, a TV ad space owner, or a TV content provider, representatives or proxies of any of those entities, or other entities. In some instances that CAS will operate independently of an ISP or TVP.

Profile provider (PP)—An entity that has or collects profile information that is used to target advertisements. In context here, the profile provider controls or cooperates with a CAS, which receives all or part of the profile information from the profile provider for use in targeting television or online advertisements. User profile information derived from online or television activity can include, for example, observed online behavior of a user accessing the Internet (e.g., online content viewed or accessed, online searches performed, online purchases made, or times and dates of such behavior), observed viewing or interaction behavior of a television viewer (e.g., television programs or ads viewed, responses to interactive programs or ads, or times and dates of such behavior), or demographic information collected from an Internet user or television viewer.

Examples of profile providers can include, but are not limited to, any entity that owns, controls, or uses: (1) a visited Internet site server; (2) a server delivering content, images, audio, video, text, or any combination directed to an online user interface device (such as a computer or other online interface device) via an online access device (such as a modem or router), either directly or indirectly (e.g., via a redirect); (3) a server delivering content, images, audio, video, text, or any combination directed to a television via a STB (indirectly via a TVP; or directly via an STB IP address, without necessarily being aware that the IP address in question corresponds to a STB); (4) a server delivering an ad to an online user interface device via an online access device on behalf of an advertiser or an ad network; (5) a server delivering a television ad to a television via a STB (indirectly via a TVP; or directly via an STB IP address, without necessarily being aware that the IP address in question corresponds to a STB) on behalf of an advertiser or an ad network; (6) a server recording an activity conducted from an online user interface device such as a click on an ad or a link to an ad, a viewing of an ad, a click on a link to particular content, a search, a request for product information, receipt of particular content, a product purchase, a telephone call made, or any other selected and definable user activity; or (7) a server facilitating instant messages or any other kind of communication on behalf of the user.

Another example of a profile provider is: (8) a company sponsoring and having access to a software program located on the user's computer or other online user interface device that can observe the user's online activity (with the user's permission), such as a browser toolbar or desktop search software. A profile provider, broadly, can be: (9) any entity able to collect behavioral profiles (e.g., observed online activity) or demographic profiles (provided by the user), typically including a device identifier (e.g., an online user interface device identifier) used when profile information was observed or collected and the date and time that profile information was observed or collected, regardless of whether or not the entity collected the profile information directly through contact with the user's computer or indirectly from another entity such as those listed in this definition. In some cases, a user's online activity will result in direct contact between the online user interface device (via an online access device) and the profile provider, e.g., if the profile provider is an online commerce site, the user makes a purchase at the site, and the online commerce site generates a profile for that user. In other instances there may be no direct contact between the profile provider and the user, e.g., if the user makes a purchase at an online commerce site that in turn reports information pertaining to the user to the profile provider. In some situations, also, a profile provider might also own or otherwise control a CAS, in which case user profiles can be immediately available to the CAS without need to transmit between entities.

Profiles or partial profiles provided by a profile provider to a CAS can contain any quantity of profile information, such as, in one example, just an online access IP address, STB IP address (not necessarily identified as such), STB identifier, or device pseudonym. The profile can include, e.g., a profile identifier or profile name, a username, or a login ID, or other online user interface device identifier; the profile can be referenced by or included in a cookie or tag placed on a user's online user interface device. The IP address can be provided by the profile provider itself or might be obtained by the CAS when a user engages in any online activity or provides an item of demographic information and is redirected by a profile provider to the CAS. In another example, a profile can be more extensive and can include demographic or online behavioral information, such as an extensive browsing history, shopping or purchase histories, content or programs viewed online, and other information concerning the user's characteristics or the user's activities. In some instances a profile includes PII (typically provided by the user); in other instances it does not.

The profile need not be stored in a single location; profile information that collectively defines a single user profile can be stored in one or more databases on one or more servers, in tags or cookies placed on one or more user interfaces devices, or at a combination of those locations. Although the profile provider is referenced in the previous several paragraphs as being an entity, many or most of the actions attributed to the profile provider are actually performed by equipment under the administrative control of the profile provider, such as computers, servers, software running on those computers or servers, network connection hardware or software, or other equipment. Such actions may still be characterized as being performed "by the profile provider," whether performed automatically, semi-automatically, or manually. Accordingly, as is common in the art, in some contexts, reference to a profile provider may refer to the computer systems or other equipment controlled by the entity rather than the entity itself.

Personally Identifiable Information (PII)—information that can be used to identify a specific person, including but not limited to: name, Social Security number (SSN), date of birth, street address, email address, static IP address (if any), phone number (home, work, wireless), financial account numbers (bank accounts, credit accounts, or any other financial data), driver's license number, vehicle registration number, vehicle license number, facial photographs, fingerprints, handwriting or signature, or any other information that can assist in identifying a specific person.

Non-Personally-Identifiable Information (non-PII)—information about a person that typically cannot be used to specifically identify that person, including but not limited to: city, state, or country of residence, age, gender, race, ethnicity, school or workplace (if sufficiently large), salary or income, hobbies, dynamically assigned IP addresses, online sites visited, online searches conducted, or other information that is useful to know about a person but does not by itself allow one knowing the information to identify the particular person.

Cookie—a text file placed on a user's computer by any server that also serves content of any type to the user's computer using browser software. That content can include, for example, an entire web page, only a portion of a web page, one or more images, or even a single pixel; the user need not be aware of every server that delivers such content, and in many cases is not (e.g., if that server delivers only a single-pixel image). The cookie typically can be read or altered only by a server operating under the same Internet domain as the server that originally placed the cookie. The cookie file can be used to identify a computer that has already been in contact with the same domain (e.g., it can act as an online user interface device identifier) and can also be used to store PII or non-PII pertaining to a user of that computer. In a first example, a cookie can store non-PII such as previous searches conducted at the site, or pages viewed or visited at the site, by the computer user. In a second example, a cookie can be used to store a username used by the user to access a site, customized preferences of the user, or various pieces of PII. A cookie file can also be created, altered, or deleted by software located on the user's computer.

Television advertisement (TV ad)—a full screen video ad, a partial screen video ad, a banner ad, a text ad, an audio ad, or any other form of ad suitable for delivery to and visual or audible presentation by a television (as defined above), which includes any device for delivering television content. TV ads can be spatially juxtaposed with or overlaid on the television program (e.g., banner ads) or can be temporally interleaved with the television program (e.g., traditional 15-, 30-, or 60-second spot ads).

Redirect (or URL redirection or URL forwarding)—the process of a server instructing a browser or application running on a computer to obtain certain requested information (e.g., all or part of a web page) from a different location by (1) a first server providing a URL to the browser or application and (2) the computer using the received URL to electronically contact the URL address. The URL could be given to the computer in many ways, for example by embedding a pixel (1×1 image tag) in an HTML page or content, via iFrame or other frame redirects, via JavaScript, via a 302 HTTP status code (in HTTP protocol, or via other 3xx status codes) in response to a request received by the first server from the computer, via redirect services, or via electronic mail. In one example, the URL could be sent to the computer following the computer coming into contact with the first server in any way, for example, following the computer accessing the first server to receive content. In another example, the URL could be given to the computer from the first server via HTML electronic mail (in this example, the URL is sent without the computer coming into contact with the first server).

Various systems and methods are used currently for targeting ads based on user, viewer, or customer behavior. Some of those may rely on the collection of PII to enable correlation of the person exhibiting the behavior and advertisements targeted at that person; in others, advertisements can be targeted without collecting PII. In those latter examples it is often the case that the medium of the behavior and that of the advertisement are the same. For example, many grocery stores hand out so-called "club cards" that need not be linked to PII. A shopper presents the card at checkout to receive various discounts, thereby allowing the store to link the list of purchased items to the card. As the system "learns" the shopper's purchasing habits, the system begins issuing coupons targeted at purchases that the shopper has made previously or that the system predicts the shopper may wish to make based on past purchases.

In another example, online advertisements are readily targeted based on an Internet user's online activities without using PII. The use of cookies enables an ad server to recognize an Internet site visitor who has been previously presented with ads by the ad server or who has conducted searches or accessed content at sites linked to the ad server; the cookies need not include PII to enable that functionality. The ad server can target future advertising to the site visitor based on that previous activity. A user who has searched for airline tickets to southern California on an online travel site, for instance, can later receive targeted online advertisements for Disneyland, delivered perhaps while visiting some other online site, to the user's computer from an ad server that collected the user's search information from the online travel site.

Regardless of whether PII is used or not, targeting advertising in one medium based on activity in another, or advertising on one device type based on activity on another, can be problematic. Various schemes currently are implemented, under development, or being considered wherein PII is used, e.g., to target television advertisements based on a viewer's online behavior. Some of those schemes involve agreements or alliances among TVPs, online access providers, online search portals, or online sites. The PII has typically been required to make the connection between the different media, because different devices are typically employed to access each one.

To satisfy various laws, regulations, or policies pertaining to user privacy in an online environment, a primary goal is to maintain segregation of a user's PII (which may or may not be used to establish as association between devices of differing media) from that user's online behavioral profile information (e.g., sites visited, content viewed, searches requested, or products purchased). It has also been deemed desirable, from a privacy perspective, to maintain similar segregation between (i) a user's online profile information and (ii) information or data on specific television viewing habits or profiles linked to a specific STB, even though that viewing data may not constitute PII.

Several proposed schemes (e.g., as disclosed in one or more of the applications listed above) would enable targeting of television ads based on observed online behavior while maintaining that segregation of PII, or without using PII at all. Whether or not PII is used, and regardless of the manner of its use, the prevalent use of dynamic device addresses, e.g., for enabling online access, creates significant technological impediments to cross-media targeting of ads.

Due to privacy reasons, it is desired to avoid reporting which TV programs or channels have been viewed using a specific STB. On the other hand, it is desired to generate (or store) STB-originated reports of which selected or default TV ads were delivered within which TV programs or on which TV channels, so as to report to the advertiser the exact number of ads delivered to the target audience through STBs and the amount owed by the advertiser as a consequence, and to report to TV ad space sellers the amount of inventory used in delivering ads and the amount they are owed as a consequence. These apparently inconsistent goals create technical obstacles to cross-media flexible advertising systems.

Recording or tracking user behavior in one medium in response to observed behavior in another, and correlating those behaviors, are also desirable goals. Such capability can enable an advertiser to target future ads more accurately, to evaluate the effectiveness of particular ads or ad campaigns, or for other purposes. However, the same issues (e.g., use of PII or not, segregation of PII from online behavioral profile information, or use of dynamic device addresses) that must be addressed for cross-media targeting must also be addressed for cross-media tracking or correlating.

DESCRIPTION

A method is performed by a profile provider (PP) entity using a computer system connected to the Internet and comprising one or more servers, and can be summarized as follows. First, a primary online device (OD1) is associated (in any suitable way) with a set-top box (STB). Second, a location of OD1 at some point in time (e.g., before, contemporaneous with, or after establishing the association with the STB) is estimated to be "near" the STB. The OD1 location at the time it is estimated to be "near" the STB is used as a proxy for the STB location in later steps. Third, one or more secondary online devices (OD2s) are observed to be located "near" the STB proxy location (i.e., the location of OD1 when it was estimated to be "near" the STB) and as a result are associated with the STB. Fourth, the system causes selection of a television advertisement to be directed to the STB, which selection is based at least in part on profile information linked to one of the associated OD2s. In the following sections, each of those activities will be described in further detail, including variations and alternatives. The disclosed methods can be employed with any suitable STB having any suitable connections; however, the disclosed methods can be particularly advantageous in situations wherein: the STB is not connected to any computer network; the STB is not ever connected to the same local area network as OD1 or OD2; or television service (used by the STB) and online access (used by OD1 and OD2s) are provided by different service providers.

Associating a Primary Online Device (OD1) with a Set-Top Box (STB)

A primary online device (OD1) is directly associated (in any suitable way) with a set-top box (STB). "Directly" merely indicates that the association between the STB and OD1 can be established explicitly. Various suitable ways for establishing or recognizing such an explicit association are disclosed in the patents and pending applications cited above. In some of those examples, a TVP/ISP can provide both online access and television service to a given subscriber, typically at a known, single location (e.g., a residence or business). An online device provided with online access (by the TVP/ISP) at that service location can be associated with the STB as OD1. In other examples, a subscriber's OD1 and STB can be associated based on both being connected to a common LAN (Local Area Network). That common connection can be detected in a variety of ways, e.g., by detecting that Internet traffic is routed to both OD1 and the STB via a common IP address or portion thereof, or by detecting that both OD1 and the STB are connected to the same router.

In other examples not disclosed in the cited patents or applications, a TVP can send an email to a subscriber that includes electronic indicia that identify the subscriber or the subscriber's STB; such identification can employ a pseudonym representing any of the data. The indicia could be incorporated, for example, as a 1×1 pixel redirect in an HTML email, or in any other suitable manner. When the subscriber opens the TVP email, the online device used to open the email is redirected to a TVP server or TVP computer system along with the STB identifier or a subscriber identifier (or pseudonym). Instead or in addition, the TVP server or computer system can gain access to a subscriber's online device and to his or her log-in data when the subscriber logs in to a TVP web site or application (e.g., a software application that enables a mobile device or tablet to act as a remote control for the STB), or when the subscriber logs in to a third-party web site or application that directs or redirects the online device to the TVP server along with the subscriber's PII. The online device used by the subscriber to open the e-mail or log-in (referred to hereafter as the initiating online device) may or may not be associated as OD1 with the subscriber's STB, as further described below.

The TVP server or computer system access to the initiating online device following the redirect or log-in enables the TVP system to associate the initiating online device with the STB, if it chooses to do so, using the PII provided by the initiating online device to pull the subscriber's STB identifier or by using the STB identifier pseudonym provided by the initiating online device. The TVP system can associate an online device identifier of the initiating online device with the subscriber's STB identifier or STB pseudonym.

In another example, a TVP presents a personalized barcode on the TV screen. The barcode is personalized in that it encodes instructions to redirect a mobile device with a camera that takes a picture of the barcode on the TV screen to an online server along with indicia identifying the subscriber's STB. The mobile device can be redirected to a PP server, or to a TVP or other server that in turn redirects to the PP server (directly or via one or more intermediary servers). The PP can then associate the STB identifier or pseudonym with an identifier of the mobile device. Additional information pertaining to the subscriber or the STB can be encoded into the personalized barcode, e.g., the geographic location of the STB. In one example a barcode, such as a two-dimensional QR ("quick response") code, is presented on a television screen, and a user is asked to photograph the barcode with his or her smartphone (for example to visit a television program web site). Barcode reader software on the smartphone decodes the barcode, which encodes a uniform resource locator (URL) usable by the smartphone's browser software. That URL indicates an online site and also includes an identifier or pseudonym for the television subscriber's STB. When the smartphone visits the online site indicated by the encoded URL, the online site server can retrieve the STB identifier or pseudonym and include it in a redirect to a PP server. The PP places, modifies, or recognizes its own cookie or other identifier on the user's smartphone to include or reference the user's STB identifier or pseudonym, thereby establishing an electronic association between the smartphone (the initiating online device) and the STB. In this example, different personalized barcodes can be sent to different television service subscribers identifying their respective STBs.

To function as primary online device OD1, an initiating online device must be (i) a stationary online device (e.g., a desktop computer or workstation) that resides at the STB location, or (ii) a mobile online device (e.g., a laptop computer, tablet, or smartphone) that is at least transiently located at the STB location. Determining whether a given initiating online device can properly function as a primary online device OD1 is described below. The TVP typically knows the location of the subscriber's STB and can employ or provide all or part of that information to perform or facilitate subsequent steps.

In the latter examples disclosed above (e.g., wherein a TVP email, a TVP site or application login, or a barcode is employed), the TVP typically conveys to a profile-provider entity (PP), or causes to be conveyed to the PP, information pertaining to the initiating online device and the subscriber's STB. Examples of such PP entities are given above. In some of the examples disclosed above, the initiating online device is redirected to a PP server or computer system (directly or via one or more intermediary servers), e.g., from a server hosting the TVP site or communicating with a software application, following a URL redirect from the TVP email to a TVP server or other server that in turn redirects to a PP server, or following a barcode-initiated visit to a TVP server or other server that in turn redirects to a PP server. Such URL redirection typically includes a URL address (or other data-passing technique) that passes electronic indicia of the subscriber's STB identifier or pseudonym, and optionally additional information pertaining to the subscriber.

Alternatively, in the email or barcode examples, the initiating online device can be directed or redirected (directly or via one or more intermediary servers) to a PP server or computer system without also making contact with a TVP server or computer system, e.g., if the email redirect or barcode includes instructions for the online device to make contact with the PP server and to convey indicia of the subscriber's STB identifier to that PP server. In that sort of example, after the TVP transmits to the subscriber the email or barcode, subsequent association of the subscriber's STB identifier or pseudonym with an identifier of the initiating online device can be established without further involvement of the TVP. As a result of any of the different redirections described above, the PP server can place, modify, or recognize a cookie on the initiating online device; that cookie can act as an online device identifier. The PP can store the received information, including indicia of the STB identifier or pseudonym, within the cookie or in a central database using the cookie as a record locator.

In addition or instead, the TVP can place, modify, or recognize its own cookie on the initiating online device and maintain a log or database of cookies or other initiating online device identifiers (such as an online device fingerprint) and associated STB identifiers for a multitude of subscribers. Such a log or database can be transmitted directly to a PP periodically, intermittently, or on an ongoing basis. The PP can use the received log to update its own database or in any other suitable fashion. In one example, the PP uses received device fingerprints (i) to recognize an initiating online device if and when it later encounters that online device or (ii) to retrieve location or profile information previously collected for a given online device. In another example, the PP and TVP use cookie syncing to sync their cookies; when the PP receives a TVP log file it can use the TVP cookie IDs to find the associated PP cookies IDs and associate the STB indicia with the relevant PP cookie ID in the PP database and perhaps also store the STB indicia in the PP cookie. In one example of cookie syncing, a TVP redirects subscribers' online devices to a PP server along with the corresponding TVP cookie identifiers. The PP server associates the TVP cookie identifiers with the corresponding PP cookie identifiers. The TVP can then provide the PP with a file containing TVP cookie identifiers and associated profile information (such as the STB indicia or geo location); the PP can use the TVP cookie identifiers to determine to which PP cookie identifiers to add the received profile information (in a central database or in the cookie, as desired).

However the information is conveyed to the PP, that information enables the PP to associate online profile information pertaining to online activity conducted via the initiating online device with the subscriber's STB identifier, as is conventional.

Estimating that the Initiating or Primary Online Device is "Near" the STB

In the course of online activity conducted via an online device, that online device may occasionally make electronic contact with a PP server. During each such contact, the PP server can estimate the location of that online device and cause that location information to be stored (e.g., in a log, history, or database, or in a cookie on the initiating online device). At the time the PP computer system receives electronic indicia of an initiating online device identifier and the subscriber's STB identifier, a PP server can (i) estimate whether the initiating online device was "near" the subscriber's STB at some time in the past (e.g., if the PP has any past location data for the initiating online device), (ii) estimate whether the initiating online device is currently "near" the subscriber's STB (e.g., if the PP has received the electronic indicia via a redirect of the initiating online device). Alternatively, the PP server can (iii) monitor the initiating online device's location, even if not continuously, and "notice" (estimate) later whether it goes "near" the subscriber's STB (e.g., by checking its location when electronic contact is later made between the initiating online device and the PP's server).

"Near" can be defined in a variety of ways, and the estimate can be made in a variety of ways. The reliability of the estimate (i.e., the probability that an improper association will be established between an OD1 and a subscriber's STB) can vary substantially depending on how "near" is defined and estimated. In the barcode example described above, the smartphone that captures an image of the barcode on the television screen can be assumed to be at the location of the STB when the image is captured, and therefore can be correctly presumed to function as OD1.

In a first example, information conveyed by the TVP to the PP (by example via direct transmission or redirect) indicates the location of the subscriber's STB. Privacy restrictions may limit the precision of such information (e.g., limited to city, zip code, neighborhood, or street); if permitted, complete address or precise geographic coordinates can be provided. Upon encountering the initiating online device, the PP can estimate its location and compare it with the STB location. The PP can estimate the location of the initiating online device by using, for example, reverse IP address lookup (e.g., in a database that includes IP addresses and geographic locations; the precision of such databases can vary from metropolitan area to exact street address, or any intermediate level of precision), device GPS coordinates or coordinate ranges, or relative signal strengths of nearby WiFi transmitters or cell towers detected by the device. Depending on the precision of the available location data (typically, but not always, more precise for the online device location than for the STB location), a suitable criterion (using one or a set of several factors) can be established for estimating whether the initiating online device and the subscriber's STB are "near" one another. The criterion can be selected to result in a desired level of confidence that the association between OD1 and the subscriber's STB has been accurately established. If the criterion is satisfied and the initiating online device is regarded as the primary online device OD1, then its location when it is "near" the subscriber's STB can be used as the proxy STB location in subsequent operations.

In another example, an online device and STB can be automatically estimated to be "near" each other without checking any location or distance criterion or threshold. For example, if a software application on the initiating online device is used to control the STB, then the initiating online device can be automatically assumed to be "near" the STB without checking any location or distance criterion. In another example, if the initiating online device is used to open an email from a TVP late at night, and if the associated STB is known to be a residential STB (e.g., because the TVP provides to the PP information pertaining to only residential STBs), it might be automatically assumed, without any location information for the STB or online device, that the initiating online device is "near" the STB (based on the presumption that late at night the subscriber is at his or her residence). In another example, if the STB is known to be residential (e.g., because the TVP provides to the PP information pertaining to only residential STBs), and if the PP identifies an initiating online device location as a residential location (e.g., because a reverse look-up of the initiating online device IP address from a third-party database identifies the IP address as being a residential IP address), then the PP might automatically assume that the initiating online device is at the STB residential location, without any location information for the STB or online device. In a variation, the PP can confirm the initiating online device location as the subscriber's STB residential location, or cancel its previous identification of the STB residential location, based on how many times it encounters the initiating online device at that location over a certain period of time (e.g., to reduce the likelihood of erroneously associating the subscriber's online device with a friend's residential STB upon detection of the subscriber's online device at the friend's residential IP address).

In another example, in instances where it is known that a STB is located at a residential location (whether or not the actual address of the residence is known) but there is no database identifying whether an IP address is assigned to a business or a residence, an initiating online device might be observed to be used at two different IP addresses, and it might be presumed that one of the IP addresses likely corresponds to the subscriber's workplace and the other to the subscriber's residence. The workplace and residence locations can be distinguished based on the number of online devices connected to a common LAN at those locations. For instance, in an IPV4 architecture, if one of the IP addresses is shared by ten different online devices and the other IP address is shared by only three different online devices, then it is likely that the first IP address is the workplace address and the second IP address is the home address because it is reasonable to presume that there are more online devices at a workplace than at a home. Similarly, in some instances in an IPV6 architecture, if the prefix of one IP address is identical to the prefix of IP addresses of nine other online devices, and if the prefix of the other IP address is identical to the prefix of IP addresses of only two other online devices, then it is likely that the first IP address corresponds to a workplace and the second IP address corresponds to a home. More generally, the number of other online devices connected to a common LAN with a given online device can indicate whether that online device is located at a residence or at a workplace.

In yet another example, if the television subscriber receives both television service and online access service from the same provider (TVP/ISP), the PP can determine the ownership of the IP address used by the initiating online device to determine whether the initiating online device is at the STB location (where the subscriber receives the television service). Such an example assumes the television subscriber receives online access service at home from a provider that is different from the provider of online access to the subscriber at the workplace or at other locations (such as coffee shops or friends' houses); otherwise the subscriber's STB might be erroneously estimated to be located at the workplace. The likelihood of such a mistake can be reduced by also considering the time of day and day of the week when the initiating online device communicates with the PP. If a weekend, regardless of the time of the day, the subscriber is likely at home if the IP address is owned by the subscriber's TVP/ISP. If a weekday (Monday to Friday) and during working hours, then the subscriber is likely at the workplace; if during the work-week and early morning, evening, or late at night, then the subscriber is likely at home. Time of day could be used independently as well (regardless of the ISP identity). If it is late in the evening, the PP might assume with high probability that the initiating online device is at home.

More generally, one exemplary solution for reducing errors in the identification of an initiating online device location as a STB location is to check the number of online user interface devices sharing a common IP address for online access at a given location (i.e., sharing the same LAN). If the number is over ten, for example, then it is more likely that the initiating online device is being used at a workplace or a public location such as a coffee shop or an airport, and it is less likely that it is being used at home (regardless of the time of day). Under such circumstances, that location should not be estimated to be the STB location or used as such in subsequent steps.

In yet another example, the PP can receive the STB geographic location from a third party that has a database of television subscribers and their TVPs. In one alternative, such a third party that has a television subscriber's personally identifiable information (PII) can redirect the subscriber's online device, e.g., after the subscriber logs in to a server of the third party, to a server or computer system controlled by the PP; that redirect can convey the geographic location of the subscriber's STB (with or without PII, as needed or desired). In another alternative the PP can receive the home or business address of an initiating online device from a third-party data provider that can redirect the initiating online device to a PP server along with the home or business address (exact home address if permitted, or less accurate address information such as a zip code if required by privacy policy or regulation). Such a redirect will likely not include PII (other than the address information).

In another example, if the PP learns that the STB is used in a residence (explicitly because informed by the TVP, or implicitly because the TVP only redirects residential subscribers' online devices), the PP can assume that the subscriber's residential address (obtained from a third party) is the location of the subscriber's STB. In another alternative, when a PP server communicates with the initiating online device, it can reverse look-up the device IP address to find its geographic location.

Regardless of the way the PP gains access to the geographic location of the online device and the geographic location of the STB, it can compare their locations. If they match, or are in close enough proximity, then the initiating online device can be estimated to be at the STB location.

In various examples (including some of those described above), information conveyed by the TVP to the PP (for example via direct transmission or redirect) indicates either a residential or commercial location for the subscriber's STB. Over time, an initiating online device that is mobile is observed at differing locations. Whether those locations are commercial or residential might be inferred based on time of day (e.g., daytime locations assumed to be commercial and evening/nighttime/early daytime locations assumed to be residential) or on the type of IP address (e.g., static IP addresses assumed to be commercial and dynamic IP addresses assumed to be residential). The initiating online device is assumed to be properly regarded as a primary online device OD1, and the proxy STB location can be the OD1 location estimated when OD1 is encountered at a time of day or from an IP address that is consistent with the type of subscriber STB location. In various cases (including some of those described above), a TVP may only provide the PP with information about residential STBs. Without receiving from the TVP information about the location or type of location of a specific STB (and perhaps only receiving indicia of the specific STB identifier), the PP can nevertheless in some instances recognize when OD1 is located at a residential location (and hence at the STB location) using the described methods (for example, time of day, or location type).

Note that there can be instances when the initiating online device is never detected "near" the subscriber's STB. That situation can arise, for example, if the initiating online device is a stationary device that resides at a location remote from the subscriber's STB, or if the initiating online device is a mobile device that is never located (or noticed to be located) "near" the subscriber's STB. Typically, an initiating online device that is never "near" the subscriber's STB will not be regarded as a primary online device OD1, its location will not be used as the proxy STB location, and subsequent steps will not be performed based on the location of that initiating online device.

In some instances, however, a so-called "two-step" association can be established based on an initiating online device that is never "near" the subscriber's STB. If a mobile online device is observed to be transiently "near" the initiating online device at various times (or if both of the mobile online device and initiating online device are used to log in to the same web site or application using the same credentials), and observed to be transiently "near" the subscriber's STB at other times, that mobile online device can function as a primary online device OD1, and its location (when observed "near" the STB) can be used as the proxy STB location. An OD1 identified using such a two-step association with a STB may be less desirable than the more direct associations described above, due to a higher probability of error in establishing the association.

Observing Secondary Online Device(s) (OD2s) "Near" the STB Proxy Location

Over time, one or more secondary online devices (OD2s) are observed to be located "near" the STB proxy location (i.e., the location of OD1 at the time it was estimated to be "near" the subscriber's STB). As a result, one or more OD2s are indirectly associated with the subscriber's STB. "Indirectly" merely indicates that the association between the STB and OD2s is established using a STB proxy location that was determined using OD1, as described further below.

This disclosure offers significant advantages over known conventional techniques because, e.g., in cases wherein the subscriber's STB is not connected to a computer network and the TVP does not provide online access to the subscriber, the STB proxy location established by OD1 may be the only way to establish any connection between the OD2s and the subscriber's STB; in known conventional techniques no connection between OD2s and the STB could be made. That is advantageous, as it enables, for example, the delivery of targeted television ads to the STB based on the online profiles of online devices used by other household members (OD2s), in addition to targeted television ads based on the online profile of the household member that uses OD1.

One or more of the online devices (OD1 or OD2s) can be mobile, so that their locations can vary with time. An association between an OD2 and the STB can be established based on OD2 being "near" the STB proxy location at a point in time before the OD1-STB association is established and the STB proxy location is estimated (e.g., looked up in a log, history or database, or recorded in a cookie on OD2), or at a point in time after the OD1-STB association was established and the STB proxy location was estimated (e.g., as a result of subsequent contact with a PP server).

In one example, OD2 being located "near" the STB proxy location can be estimated by OD1 and OD2 sharing a common LAN (at least transiently). In one case of this example, OD1 is estimated to be "near" an associated residential STB (in any of the ways described above), and the IP address (or part of the IP address, such as an IP address prefix) used by OD1 at the time of the estimate is used as a proxy for the STB location. Other online devices (OD2s) for which Internet traffic is routed via an identical or partially identical IP address are estimated to be connected to the same LAN as OD1, to be at the same location (because they are connected to the LAN), and to be at the same location as the STB. The OD2s thus identified are associated with the STB. The estimation that an OD2 is at or near the STB location need not occur while OD1 is at or near the STB location. In another example, GPS coordinates of OD2 can be compared to the OD1 location when OD1 was estimated to be "near" the STB. If the OD2 GPS coordinates are close enough (based on any suitable criteria), then the OD2 is associated with the STB. Again, the estimation that an OD2 is close enough to the STB location need not occur while OD1 is near the STB location.

In some examples, an association between a STB and an online device OD2 can be undone by a PP server under certain circumstances. If the PP recognizes that an OD2, that was associated with the STB due to the sharing of a common LAN with an OD1 associated with the STB, does not again share a common LAN with OD1 for more than a week (or other suitable period of time), then it can be inferred that the STB-OD2 association was not correct (e.g., perhaps OD2 belonged to an infrequent visitor to the STB location).

TV Ad Selection/Presentation Based on OD2 Profile

After an online device OD2 is associated with the STB as one of a set of one or more OD2s, targeted television advertisements can be selected (by or at the direction of the PP) based at least in part on profile information associated with OD2, e.g., (i) online behavioral profile information such as browsing history or search history of a user of OD2, (ii) demographic information associated with a user of OD2, (iii) offline profile information pertaining to a user of OD1 or a user of OD2 and acquired with the assistance of the TVP (described further below), or (iv) offline profile information pertaining to a user of OD2 and acquired according to the teachings of, e.g., U.S. Pat. No. 7,890,609 referenced above. The television advertisements thus selected can be directed to the STB for presentation.

The targeted television advertisements can be selected based on receiving a notification, wherein the notification: (i) includes or references an STB identifier, and (ii) results from and signifies a television ad being presented using the STB that corresponds to the STB identifier.

Although the approach is described herein mostly with respect to selecting an ad for presentation via the OD2, the methods and systems disclosed herein can be used for other actions taken with respect to online activity through the OD2 subsequent to presentation of the television ad, including not only causing a selected online ad to be directed to the OD2 but also causing recording that a select online activity occurred subsequent to presentation of the television ad, which online activity was tracked from the OD2.

The time and manner of the television ad presentation can be determined in a variety of ways. In various disclosed exemplary methods, targeted television advertisements can be selected or presented based on the likelihood of the user of OD2 viewing specific TV programs/channels or watching television at specific times/dates, based on one or both of (i) a correlation between the OD2 user's profile information and specific programs/channels (as described in several of the cited references), or (ii) a presumption that OD2 is near the STB, and by inference that the OD2 user is present and watching television, based on an estimate that OD2 is near the STB at a given time/date (as described above) or based on a location history of OD2 at specific times/dates (as described below).

In some disclosed exemplary methods, targeted television advertisements are selected based on profile information associated with OD1 or one or more OD2s. The advertisements thus selected can be transmitted in advance to the STB for storage (e.g., in a DVR) and presented later, or can be transmitted in real time or "on demand" as needed. The selected ads can be presented within specific TV programs/channels or on specific times/dates, e.g., according to the teachings of U.S. Patent Pub. 2009/0300675, U.S. Patent Pub. 2009/0299843, or App. Ser. No. 61/393,834 referenced above. The television advertisements can be selected/presented based on an expectation that the user of OD2 is likely to be viewing those specific TV programs/channels at those dates/times (independently of whether OD2 is presumed to be "near" the STB at those dates/times).

Based on the profile information associated with OD2 (online or offline profile information), television ads are selected (by or at the direction of the PP) to be directed to the STB associated with OD2 as described above. When selecting ads, additional parameters can be taken into account such as which television program or channel is being watched or likely watched on the STB and the likelihood that the OD2 user is watching that TV program/channel (e.g., based on correlation between the OD2 user's profile information and the TV program/channel, as disclosed, e.g., in U.S. Patent Pub. 2009/0300675, U.S. Patent Pub. 2009/0299843, or App. Ser. No. 61/393,834) referenced above.

In some other exemplary methods, the selected television advertisement is presented only when OD2 is presumed to be "near" the STB. Only at a given point in time when one of the OD2s is presumed (in any suitable way) to be located "near" the STB proxy location does the system trigger presentation of a targeted television advertisement for the STB, which targeted advertisement is selected based on profile information associated with that nearby OD2. In other words, a presumption that OD2 is "near" the STB at a given point in time is used to infer that the user of OD2 is watching television at that time, and that a television advertisement targeted at the user of OD2 should be presented. Whether the OD2 is "near" the STB proxy location can be estimated in any of the various ways described above for establishing the association between OD2 and the STB, or can be inferred based on a history or log of OD2 being "near" the STB in the past (described further below). The television advertisements can be selected and delivered to the STB in any of the ways and at any of the times described above (e.g., selected and delivered to the STB ahead of time, selected or delivered in real time or on demand, or variations of those methods).

Regardless of the manner in which a television ad is selected or a program/channel or time/date is determined for delivering the selected ad, the ad can be delivered or presented in any suitable way. In some examples, the selected television advertisement (or an identifier thereof) is sent by the PP to the TVP, along with the STB identifier or pseudonym (i.e., the STB identifier or pseudonym that was received from the TVP as being associated with OD1, and later associated with OD2 estimated to be at the STB location) and an indicator of the program, channel, time, or date on or during which the ad is to be presented. The TVP can use that information to arrange the presentation of the television advertisement on the STB at a suitable point in time. The PP can typically transmit the selected television advertisement, or an identifier thereof, to a CAS operated by the TVP along with the subscriber's STB identifier. The profile information (online or offline) pertaining to OD2 need not be conveyed to the TVP. In some examples, the PP can associate observed online behavior on OD2 with the selected targeted television advertisements delivered or presumed delivered on the STB associated with OD2, for online behavior that takes place on OD2 after the expected or reported presentation of the selected targeted television advertisements on the STB (as disclosed, e.g., in U.S. Patent Pub. 2009/0172728 or application Ser. No. 12/906,007 referenced above).

In various examples, television advertisements can be selected based on profiles associated with one or more OD2s associated with a STB, and then transmitted for storage on the STB, on an ad server or other server, or on another device; the stored television advertisement is presented only at a suitable point in time according to electronic instructions. In some cases, the stored television advertisement is shown only when the correct channel is being watched or during the correct television program. In another case, only when one of those OD2s is presumed to be "near" the STB (by the STB, PP, TVP, or a third party) is a corresponding stored television advertisement presented. In various cases, instructions stored in the STB cause the STB to present a stored ad when the STB detects a "nearby" OD2, or to present a stored ad when an OD2 is inferred to be "near" the STB based on a location history of that OD2, or to present a stored ad following detection of a "nearby" OD2 by the PP, TVP, or a third party. In another case, a selected television advertisement can be presented according to instructions stored in or received by an ad server to present an ad stored in the ad server. Different television ads can be presented at different times depending on different OD2s being presumed to be located near the STB proxy location at those different times.

Additional Features or Embodiments

In examples wherein the presence of an online device is inferred based on a history or log of that online device being "near" an associated STB, such a history or log can be analyzed to predict future times when the online device will be present at the STB location (and therefore times when the user of the online device might be inferred to be present and watching television). For example, if an online device is connected to the Internet via the same IP address every Tuesday evening after 7 PM for the past three weeks, it might be presumed that the online device will be connected to the Internet via that same IP address on the next Tuesday evening after 7 PM. If the online device (when accessing the Internet via that IP address) was associated with a specific STB, then television advertisements targeted based on profile information associated with the online device can be transmitted to the STB for presentation on the following Tuesday evening after 7 PM. Such a technique for estimating future presence of an online device near a STB can be employed for choosing a time for presenting a television advertisement targeted based on OD2-associated profile information in the context of methods disclosed above, i.e., for presenting an OD2-targeted advertisement via the OD2-associated STB at a future time when that OD2 is predicted to be near that STB. That technique can also be employed for choosing a time for presenting a television advertisement targeted based on OD1-associated profile information, i.e., for presenting an OD1-targeted advertisement via the OD1-associated STB at a future time when that OD1 is predicted to be near that STB.

The particular temporal pattern described above (Tuesday evening after 7 PM) is only exemplary; any discerned temporal pattern of an online device estimated to be "near" an associated STB can be employed as a basis for predicting future nearness of the associated online device and STB. The particular criterion for "nearness" described above (use of a particular IP address) also is only exemplary. Any suitable criterion for nearness, including those already described above for establishing associations between OD1 and the STB or between OD2 and the STB, can be employed as a basis for logging or recording an online device's history of being near an associated STB and for predicting future nearness of the associated online device and STB. In a similar manner, predicting future nearness of an online device to its associated STB can be based on geographic coordinates, street address, or any other suitable indicator of the online device's past locations.

In many cases IP addresses used by online devices for online access are dynamic rather than static. This could create a problem when an IP address (or a portion thereof, such as the IP address prefix shared with the router of a LAN) is used as a proxy for a STB location. An online device in the previous example (an OD2, for example) can be estimated to be near an associated STB even if its IP address changes from one Tuesday evening to the next. If the same group of OD2s (each recognized by a unique cookie, tag, or device fingerprint, for example) were detected connected to a common LAN every Tuesday evening after 7 PM, then those OD2s could be presumed to be located at the same location every Tuesday evening after 7 PM even if the IP address via which they receive Internet traffic changes from day to day or week to week. If one of those temporary IP addresses had been estimated to be "near" a specific STB, or if an online device of the group connected to the LAN had been associated with a specific STB when that online device was connected to that LAN, then the entire group of OD2s can be associated with the STB. A LAN to which this group of OD2s is connected in the future can be similarly inferred to represent the STB location. A prediction that one of the OD2s will be at that STB location on a future Tuesday evening can be made despite any change of the IP address via which Internet traffic is received by the online device. Put another way, detection of a recognizable combination of multiple online devices connected to a common LAN can serve as a proxy for the associated STB location. Further, any online device recognized as being connected to the same LAN as the other online devices of the group could also be associated with the same STB.

The sharing of a LAN by a group of devices (e.g., multiple online devices and/or a STB connected to a common LAN) can be recognized using different techniques. In one example, online devices sharing a LAN in an IPV4 architecture can be recognized by a web server communicating with the online devices as having the same IP address, i.e., the IP address of the modem connecting the LAN to the Internet. Based on that common IP address, the web server can infer that the online devices share a LAN. In another example, online devices sharing a LAN in an IPV6 architecture might be recognized by a web server communicating with the online devices as having a partial identical IP address (e.g., due to the online devices sharing a sub-net (the LAN), the prefixes of their IP addresses would be the same). Based on the sharing of part of an IP address, the web server can infer that the online devices share a LAN. In yet another example, online devices sharing a LAN (for example in an IPV6 architecture) can be recognized as such by a web server that has access to the online devices' IP addresses using the following method. The server can trace the route through the Internet from the server (the origin) to each online device (the destination), e.g., using a command such as "tracert" in a Windows® operating system. The server can recognize that the router, one "hop" before the route ends at each online device, is the same router for all of the online devices of a group. As a consequence, the server can infer that online devices receiving Internet traffic via that router are connected to a common LAN. (The server can recognize the router according to its IP address and optionally can determine whether the router's IP address is a residential or commercial IP address using a third party database.) More generally speaking, a LAN can serve as a proxy for a STB location. The LAN can be identified in different ways. Some of those ways include, but are not limited to: (a) the IP address of a modem connecting the LAN to the Internet in an IPV4 architecture, (b) the prefix of an IPV6 address of devices connected to the LAN or of the LAN's router, or (c) the IP address of the LAN's router.

Any suitable criterion can be employed for estimating a common location for multiple online devices. For example, if three or more of a group of five online devices are often detected connected to a common LAN (in any suitable way, including those described above), then later detecting three of those five online devices connected to a common LAN characterized by a different IP address (or portion thereof) within, e.g., two hours or other suitable time interval, might be a suitable criterion for estimating that the different IP address (or portion thereof) corresponds to the associated STB location. In some instances detecting at least two of the online devices connected to the same LAN might be sufficient, while in other instances detecting four or more online devices connected to the same LAN might be necessary for a reliable presumption of nearness of the online devices to their associated STB.

Additional examples of ways to determine the location of OD2 that is "near" a STB include the recognition of the usage of a software application on OD2 to control the associated STB, the usage of OD2 to add a movie to an instant queue from which that movie is later pulled to be watched from the STB (within a pre-determined period of time), the taking of a photo of a personalized barcode on the TV screen connected to the STB using OD2 (for example for the purpose of receiving a phone call to the home phone to learn about a product advertised on the television or to be able to view the advertised product web site on the smartphone screen). Such methods can also be employed to estimate that an initiating online device is "near" the STB and can be accurately presumed to function as OD1.

In another example, a portable device location such as a mobile phone location can serve as an indication of the user location. For example, if a user's laptop (an OD2) is associated with the user's mobile phone (another OD2), the mobile phone user is at home with the mobile phone, and the laptop was left at work, then the home STB can be targeted with ads based on online activity on the laptop when the mobile phone is recognized to be at home, even if the laptop is not.

In another variation, an online device is considered to be "near" the STB or not "near" the STB if its location was recorded within a pre-determined time period prior to the targeting of an ad to the STB (for example 30 minutes) and that recorded location is determined to be "near" or not "near" the STB.

Although a PP could be an independent third party, in some cases it could be owned by a television provider or another entity involved in the sending of ads to STBs. The PP can work with a CAS operated by another entity in some situations. In other cases, a CAS could be owned or operated by a PP. Other combinations are also possible.

In another example, location information of the STB is not shared by the TVP at all. The PP associates the initiating online device with different locations where it identifies the device ("location" defined in any of the various ways described above). For each such associated location, the PP further associates with the initiating online device other online devices identified by the PP as visiting that location. The time and date when each device was identified at a location can also be recorded. The PP selects different television ads targeted based on profile information associated with the different online devices associated with the different locations visited by the initiating online device. The PP provides the TVP with the television ads targeting the different online devices along with indicators of their respective locations (and possibly the time and date they were identified at that location). The TVP, which has access to STB location information, but does not share the information, can then compare the different locations with the STB location and deliver to the STB ads selected based on OD2 profiles for only those online devices that were detected at the STB location.

Profile information associated with a given OD2 and used for selecting television advertisements targeted to a user of OD2 can originate from a variety of sources. For example, the PP can collect demographic or behavioral profile information based on online activity of the user of OD2, e.g., as disclosed by U.S. Pat. Nos. 6,925,440, 7,428,493, or U.S. Patent Pub. 2008/0313194 referenced above. In another example, the PP can obtain offline profile data pertaining to a user of OD2 that is a subscriber of an ISP that provides online access to the user of OD2, e.g., as disclosed by U.S. Pat. 7,890,609 referenced above. In another example, the PP can obtain offline profile data pertaining to a user of OD1 (i.e., the television subscriber of the TVP). That offline data can be obtained from the TVP or from a third-party provider of such offline data (typically facilitated by the TVP). The offline data typically is added to a profile for the user of OD1. However, providers of such offline profile information (e.g., credit reporting bureaus or direct-mail marketing companies) typically link much of the information by household. For example, such offline data for a husband and wife residing at the same address typically would be linked to one another. Therefore, it can be desirable for the PP also to link, to the profile associated with OD2, offline data obtained for the user of OD1. If the users of OD1 and OD2 are members of the same household, then a significant portion of the offline data obtained for the OD1 user will be pertinent to the OD2 user. The offline data associated with OD1 (facilitated by the TVP), can be associated with OD2 even if OD2 is "near" the STB location only transiently. The offline data thus associated with OD2 can be used to select television ads to be delivered to OD2 user on the associated STB; in addition, that offline data can also be used to select online ads to be delivered on OD2.

The TVP can transmit offline profile information, or facilitate transmission from a third-party provider of such information, to the PP in any suitable way. For example, in several of the methods employed by the TVP to associate a primary online device OD1 with a STB (e.g., wherein a TVP email, a TVP site or application log in, or a personalized barcode is employed), the TVP can transmit to the PP offline profile data pertinent to the television subscriber (i.e., the user of OD1). The offline data can comprise information collected by the TVP itself, or can include information collected by the TVP from third-party providers. The offline data can be transmitted in any suitable manner, including those described above for conveying to the PP the STB identifier or pseudonym. The STB identifier or pseudonym and the offline data can be transmitted by the TVP to the PP together, or the offline data can be transmitted later and labeled with the STB identifier or pseudonym, to enable the PP to link the offline data to the STB and to any OD1 or OD2s associated with the STB. In another example, the TVP can transmit to a third-party offline data provider the television subscriber name (which is also the OD1 user name) and the corresponding STB identifier or pseudonym (which identifier or pseudonym is also transmitted to the PP to associate STB and OD1). The third-party data provider can in turn retrieve the pertinent offline data and transmit it to the PP along with the STB identifier or pseudonym, thereby enabling the PP to link the transmitted offline data to the OD1 profile, and also to any associated OD2 profiles, if desired. Use of a STB pseudonym may be preferred in this example, to limit the number of entities that become aware of the actual STB identifier used by the TVP. To address subscriber privacy concerns in any of the foregoing examples, it may be desirable that no PII (or only limited PII) be included in the offline data transmitted to the PP.

In may be desirable, required, or necessary to maintain segregation of a subscriber's PII and online behavioral information. In the methods described above, the PP need not convey to the TVP any of the online profile information pertaining to online activity conducted via OD1 or any OD2. Conversely, the TVP (or third-party offline data provider) need not convey to the PP the subscriber's PII, except possibly location information for the subscriber's STB. That location information can be made as precise or imprecise as needed or desired to maintain a desired balance between maintaining subscriber privacy and establishing STB/OD1/OD2 associations with a necessary or desired level of accuracy.

None of disclosed methods necessarily require the subscriber's PII to be transmitted to the PP; neither is such merging of PII and online profile information necessarily precluded. The merging of PII with online behavioral profile information would require asking consumers to opt-in and agree to the merger of the data. Segregation of PII from online behavior information can be opt-out-based and does not require asking consumers to agree; they can opt-out if they so choose. Because opt-out-based solutions enable large scale deployments whereas opt-in-based solutions usually lead to limited-scale deployments, it may be desirable in many instances to implement the methods described herein in an opt-out fashion, maintaining segregation of the subscriber's PII from his or her online behavioral profile information.

One or more servers of the PP computer system can be programmed and connected to record in a log, history, tag or database time, date, and location data for each electronic contact with a multitude of online devices. Location data can include device GPS coordinates, identifiers of surrounding WiFi networks or cells towers and their relative signal strengths as recorded by the device, IP address, LAN proxies (e.g., the IP address of the modem connecting the LAN to the Internet, or the IP address or IP address prefix of the LAN's router), physical address, or other data that directly or indirectly can enable the computer system to determine, estimate, or infer the location of the online device. One or more PP servers can be further programmed and connected to receive data pertaining to an initiating online device used by a TVP subscriber and that subscriber's STB identifier and to store such data in a log, history, tag, or database. One or more PP servers can be further programmed and connected to search, on a batch, on-demand, or ongoing basis such logs, histories, or databases to seek online device locations that might be "near" an STB location or "near" another online device location. Various steps of the methods described above can be performed in response to finding such pairs of nearby device locations. Various steps of the methods described above can be performed in response to collection of a new piece of data (e.g., upon encountering of an online device, whether following a URL redirection from a TVP server or another PP server, at a certain time of the day, or from a specific location or type of location, and so on).

In any of the examples including delivery of targeted online ads or targeted television ads, the ads can be provided by a wide variety of sources or entities, and revenues can be generated and distributed in a wide variety of ways. Examples are disclosed in one or more of the applications cited above. In various examples, a PP can be compensated for enabling targeting of a television advertisement (based on online profile information) as well as targeting an online advertisement (based on actual or presumed viewing of the television ad). In another example, a PP could be compensated for providing information that is used in measuring the effectiveness of television advertisements.

For example, if following the presumed viewing of a Nissan Murano (an SUV) TV ad on a STB, an associated online user interface device is used to research the Nissan Murano on cars.com (a car review site), if cars.com redirects all visitor computers that read reviews of the Nissan Murano on cars.com to the CAS, then as a consequence of the redirect, the CAS can recognize the visit from the online interface device associated with the STB where the Nissan Murano television advertisement was presumed viewed. Such information can be very valuable for the advertiser. The advertiser or an advertiser representative (such as an ad agency), or an entity providing the advertiser with the service of measuring the effectiveness of the advertiser's TV ads as reflected by follow-up online behavior, could compensate cars.com for redirecting to the CAS those computers that visit cars.com's Nissan Murano review section.

In another example, a PP is compensated for the usage of offline data in targeting an OD2 with online ads or the usage of offline data in targeting an OD2 user on a STB associated with OD2 with television ads, where, in both cases, the offline data is received by the PP following the facilitation of the TVP.

The TV ads directed to STBs at the request of a PP can come from a variety of sources. Likewise, online ads directed to online user interface devices can come from a variety of sources. In one example, a given PP can request that the CAS direct an advertisement to the user's STB or online user interface device from (or on behalf of) the PP itself (if, for example, the PP is an online advertiser site interested in delivering TV ads to people that visited its online site) or from another entity that sells ad space to advertisers, some of whom may desire to present ads to the PP site's presumed audience. In that example, the proprietor of the CAS, as the facilitator of the targeted ad delivery, can receive a payment from the PP. The CAS proprietor can keep a share of revenue as a commission and pay the TVP for the ad space (except in the case where the CAS proprietor owns the ad space). The TVP can either retain the entire amount paid by the CAS proprietor, if the TVP owns the TV ad space within which the TV ad was delivered, or the TVP can pay some or all of the amount paid by the CAS proprietor to another entity such as a TV broadcasting network, if the TVP does not own the ad space.

In another example, the CAS can pay the TVP for electronically associating the online user interface device and STB, pay a television ad space seller for the TV ad space, and pay an online site (or profile aggregator) for the use of its profile data in targeting the TV ad (unless the online site sold the TV ad or requested its delivery).

In still another example, the CAS can record which entity is entitled to what payments, and payments are made directly from the television ad space seller or television advertiser to the various entitled entities, based on the CAS's records.

In an example wherein the STB is provided by a third party other than the TVP (such as a service provider like Tivo), the STB provider can arrange with content owners (such as a TV broadcasting network) to have the service provider's STBs replace broadcasted TV ads with targeted TV ads, where a targeted TV ad is available, and the service provider and the TV broadcasting network can share the revenue with the CAS proprietor as discussed above. In some cases, the CAS can be owned by a TVP, an ISP, an STB provider, an online site, an advertiser, an advertising agency, an advertiser representative, an online ad space seller, a TV ad space owner, or a TV content provider, in which case the payments will be divided in accordance to the respective roles. In general, a payment from a TV advertiser is used to pay the TV ad space owner and the entities facilitating the delivery of the targeted TV ad.

In another example, the online site or other PP can request that a television ad be directed to the user's STB from another advertiser of its own choosing to whom the online site has sold an amount of television advertising space, or that an online ad be directed to the user's online user interface device from another advertiser of its own choosing to whom the PP has sold an amount of online advertising space. In that example the PP or online site can collect a revenue amount from the site-chosen advertiser while paying the CAS, ISP, TVP, ISP/TVP, or ad space owner(s) in return for assisting to facilitate delivery of the ad(s) provided by the site-chosen advertiser.

In another example, the PP provides a profile to the CAS in return for a payment triggered (1) every time the provided profile (whether including behavioral or demographic data) is used to deliver a TV ad, (2) when a TV ad that has been delivered using the provided profile generates revenues, (3) every time the provided profile (whether including behavioral or demographic data) is used to deliver an online ad, (4) when an online ad that has been delivered using the provided profile generates revenues, or (5) simply on account of delivery of the profile without regard to whether, how often, or how effectively it is used.

The TV or online advertisement itself can be sold by the CAS, ISP, TVP, ISP/TVP, STB provider, TV ad space owner, or any third party such as a reseller or a firm that represents ad space owners or PPs and sells to advertisers. In that example the PP can collect a revenue amount from any of the entities benefiting from the delivery of the TV or online ad based on the profile provided by the PP, including the ad space owner, STB provider, CAS, ISP, TVP, ISP/TVP, or a third party selling the targeted ad space. The PP, reseller, or the other advertisers can also pay a revenue amount to the CAS, ISP, TVP, or ISP/TVP in return for directing the ad to the STB.

A third party offline data provider that provides a PP with offline data following the facilitation of a TVP, could in one example receive a payment from the PP or any other entity benefiting from the usage of the offline data in targeting ads to an OD2 user, whether those ads are online ads on OD2 or television ads on a STB associated with OD2. In another example, the offline data provider pays the PP for associating the offline data with device OD2 thereby enabling usage of the offline data in targeting OD2 with online ads or targeting the OD2 user with television ads on a STB associated with OD2. The third party offline data provider could pay the PP for the association, when the data is used to target ads, when the ads targeted using the data generate any response (including sales), any combination of those payment methods, or any other compensation method.

The systems and methods disclosed herein can be used to generate revenue in a variety of ways for various of the involved entities, not limited to the examples given here, that fall within the scope of the present disclosure or appended claims. The terms "pay," "collect," "receive," and so forth, when referring to revenue amounts, can denote actual exchanges of funds or can denote credits or debits to electronic accounts, possibly including automatic payment implemented with computer tracking and storing of information in one or more computer-accessible databases. The terms can apply whether the payments are characterized as commissions, royalties, referral fees, holdbacks, overrides, purchase-resales, or any other compensation arrangements giving net results of split advertising revenues as stated above. Payment can occur manually or automatically, either immediately, such as through micro-payment transfers, periodically, such as daily, weekly, or monthly, or upon accumulation of payments from multiple events totaling above a threshold amount. The systems and methods disclosed herein can be implemented with any suitable accounting modules or subsystems for tracking such payments or receipts of funds.

Various actions or method steps characterized herein as being performed by a particular entity typically are performed automatically by one or more computers or computer systems under the control of that entity, whether owned or rented, and whether at the entity's facility or at a remote location. The methods disclosed here are typically performed using software of any suitable type running on one or more computers, one or more of which are connected to the Internet. The software can be self-contained on a single computer, duplicated on multiple computers, or distributed with differing portions or modules on different computers. The software can be executed by one or more servers, or the software (or a portion thereof) can be executed by an online user interface device used by the electronic visitor (e.g., a desktop or portable computer; a wireless handset, "smart phone," or other wireless device; a personal digital assistant (PDA) or other handheld device; a television or STB). Software running on the visitor's online user interface device can include, e.g., Java™ client software or so-called adware. Some methods can include downloading such software to an electronic visitor's online user interface device to perform there one or more of the methods disclosed herein.

The profile information described can be included as a portion of the tags or cookies placed on a visitor's device, or the tags or cookies can merely include an identifier associated with the visitor's profile that is stored elsewhere (e.g., in a database on a profile owner server, profile supplier server, or media property server). The profile information need not be stored in a single location or under the control of a single entity, nor does control or use of the profile information need to be performed at a single location or under control of a single entity.

The systems and methods disclosed herein can be implemented as general or special purpose computers or servers or other programmable hardware devices programmed through software, or as hardware or equipment "programmed" through hard wiring, or a combination of the two. A "computer" (e.g., a "server" or an online user interface device) can comprise a single machine or processor or can comprise multiple interacting machines or processors (located at a single location or at multiple locations remote from one another). A computer-readable medium can be encoded with a computer program, so that execution of that program by one or more computers causes the one or more computers to perform one or more of the methods disclosed herein. Suitable media can include temporary or permanent storage or replaceable media, such as network-based or Internet-based or otherwise distributed storage of software modules that operate together, RAM, ROM, CD ROM, CD-R, CD-R/W, DVD ROM, DVD±R, DVD±R/W, hard drives, thumb drives, flash memory, optical media, magnetic media, semiconductor media, or any future storage alternatives. Such media can also be used for databases recording the information described above.

It is intended that equivalents of the disclosed exemplary embodiments and methods shall fall within the scope of this disclosure or appended claims. It is intended that the disclosed exemplary embodiments and methods, and equivalents thereof, may be modified while remaining within the scope of this disclosure or appended claims.

In the foregoing Detailed Description, various features may be grouped together in several exemplary embodiments or examples for the purpose of streamlining the disclosure. However, inventive subject matter may lie in less than all features of a single disclosed exemplary embodiment. No feature should be considered "essential" or "necessary" absent express reference to that effect. The present disclosure shall also be construed as implicitly disclosing any embodiment having any suitable combination of disclosed features or examples (i.e., combinations of features or examples that are not incompatible or mutually exclusive) that appear in the present disclosure, including those combinations of features or examples that may not be explicitly disclosed herein in a stated combination.

For purposes here, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes here, the words "comprising," "including," "having," and variants thereof, wherever they appear, shall be construed as open-ended terminology, with the same meaning as if the phrase "at least" were appended after each instance thereof.

If the provisions of 35 USC § 112 ¶ 6 are desired to be invoked in any apparatus claim associated herewith, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112 ¶ 6 are not intended to be invoked for that claim.

What is claimed is:

1. A method implemented using a first programmed hardware computer system, the method comprising:
   (a) when the first programmed hardware computer system and a second Internet-accessing online device are in communication with one another, with the first programmed hardware computer system, automatically sending an electronic transmission that automatically causes another computer system to take an automatic action with respect to the second Internet-accessing online device, wherein the automatic action is performed based at least in part on profile information associated with a first Internet-accessing online device, wherein the first Internet-accessing online device is different from the second Internet-accessing online device;
   (b) wherein the act in part (a) is performed using data identifying the second Internet-accessing online device as a member of a set of associated online devices that includes the first Internet-accessing online device, the second Internet-accessing online device, and at least one additional online device;
   (c) wherein the data establishes the association in part (b) based on an automatic computerized determination, using a second programmed hardware computer system, that:
      (i) network traffic was routed to each of the set of associated online devices using a first, common IP address or portion thereof during a first time period; and
      (ii) network traffic was routed to a selected minimum number of online devices of the set of associated online devices, not including the second Internet-accessing online device, during a second time period, which is after the first time period and before the act in part (a) is performed, using a second, common IP address or portion thereof that is different from the first, common IP address or portion thereof, wherein the minimum number of devices is at least two and less than the number of online devices in the set of associated online devices; and
   (d) wherein the first programmed hardware computer system and the second programmed hardware computer system are controlled by entities that are third-parties to one another and that are each outside both a first local area network defined by the first IP address or portion thereof and a second local area network defined by the second IP address or portion thereof.

2. The method of claim 1 wherein the first time period has a selected duration.

3. The method of claim 1 wherein the automatic action comprises selecting an advertisement to be directed to the second Internet-accessing online device.

4. The method of claim 3 wherein the first programmed hardware computer system comprises an ad server computer system of an ad network or ad exchange.

5. The method of claim 1 wherein the first programmed hardware computer system comprises an ad server computer system of an ad network or ad exchange.

6. The method of claim 1 wherein the first programmed hardware computer system comprises a server of an Internet website visited by the second Internet-accessing online device.

7. The method of claim 6 wherein the automatic action comprises selecting an advertisement to be directed to the second Internet-accessing online device.

8. The method of claim 6 wherein (i) the first device is a set-top box (STB), (ii) the profile information indicates a television advertisement of a proprietor of the Internet website was presented via the STB, and (iii) the action comprises recording indicia of the second Internet-accessing online device having visited the Internet website, for the purpose of measuring the effectiveness of the television advertisement.

9. The method of claim 1 wherein the profile information associated with the first Internet-accessing online device comprises demographic profile information pertaining to a user of the first Internet-accessing online device.

10. The method of claim 1 wherein the profile information associated with the first Internet-accessing online device comprises behavioral profile information derived from online activity performed with the first Internet-accessing online device.

11. The method of claim 10 wherein the first programmed hardware computer system comprises a server of an Internet website visited by the second Internet-accessing online device.

12. The method of claim 1 wherein (i) the first Internet-accessing device comprises a mobile device, and (ii) the profile information associated with the first Internet-accessing online device comprises profile information collected when the mobile device accessed the Internet other than via the first, common IP address or portion thereof and other than via the second, common IP address or portion thereof.

13. The method of claim 12 wherein (i) the automatic action comprises selecting an advertisement to be directed to the second Internet-accessing online device, (ii) the first programmed hardware computer system comprises a server of an Internet website visited by the second Internet-accessing online device; and (iii) the profile information associated with the first Internet-accessing online device comprises behavioral profile information derived from online activity performed with the first Internet-accessing online device.

14. A first hardware computer system programmed to perform a method comprising:
(a) when the first programmed hardware computer system and a second Internet-accessing online device are in communication with one another, with the first programmed hardware computer system, automatically sending an electronic transmission that automatically causes another computer system to take an automatic action with respect to the second Internet-accessing online device, wherein the automatic action is performed based at least in part on profile information associated with a first Internet-accessing online device, wherein the first Internet-accessing online device is different from the second Internet-accessing online device;
(b) wherein the act in part (a) is performed using data identifying the second Internet-accessing online device as a member of a set of associated online devices that includes the first Internet-accessing online device, the second Internet-accessing online device, and at least one additional online device;
(c) wherein the data establishes the association in part (b) based on an automatic computerized determination, using a second programmed hardware computer system, that:
(i) network traffic was routed to each of the set of associated online devices using a first, common IP address or portion thereof during a first time period; and
(ii) network traffic was routed to a selected minimum number of online devices of the set of associated online devices, not including the second Internet-accessing online device, during a second time period, which is after the first time period and before the act in part (a) is performed, using a second, common IP address or portion thereof that is different from the first, common IP address or portion thereof, wherein the minimum number of devices is at least two and less than the number of online devices in the set of associated online devices; and
(d) wherein the first programmed hardware computer system and the second programmed hardware computer system are controlled by entities that are third-parties to one another and that are each outside both a first local area network defined by the first IP address or portion thereof and a second local area network defined by the second IP address or portion thereof.

15. The computer system of claim 14 wherein the first time period has a selected duration.

16. The computer system of claim 14 wherein the automatic action comprises selecting an advertisement to be directed to the second Internet-accessing online device.

17. The computer system of claim 16 wherein the first programmed hardware computer system comprises an ad server computer system of an ad network or ad exchange.

18. The computer system of claim 14 wherein the first programmed hardware computer system comprises an ad server computer system of an ad network or ad exchange.

19. The computer system of claim 14 wherein the first programmed hardware computer system comprises a server of an Internet website visited by the second Internet-accessing online device.

20. The computer system of claim 19 wherein the automatic action comprises selecting an advertisement to be directed to the second Internet-accessing online device.

21. The computer system of claim 19 wherein (i) the first device is a set-top box (STB), (ii) the profile information indicates a television advertisement of a proprietor of the Internet website was presented via the STB, and (iii) the action comprises recording indicia of the second Internet-accessing online device having visited the Internet website, for the purpose of measuring the effectiveness of the television advertisement.

22. The computer system of claim 14 wherein the profile information associated with the first Internet-accessing online device comprises demographic profile information pertaining to a user of the first Internet-accessing online device.

23. The computer system of claim 14 wherein the profile information associated with the first Internet-accessing online device comprises behavioral profile information derived from online activity performed with the first Internet-accessing online device.

24. The computer system of claim 23 wherein the first programmed hardware computer system comprises a server of an Internet website visited by the second Internet-accessing online device.

25. The computer system of claim 14 wherein (i) the first Internet-accessing device comprises a mobile device, and (ii) the profile information associated with the first Internet-accessing online device comprises profile information collected when the mobile device accessed the Internet other than via the first, common IP address or portion thereof and other than via the second, common IP address or portion thereof.

26. The computer system of claim 25 wherein (i) the automatic action comprises selecting an advertisement to be directed to the second Internet-accessing online device, (ii) the first programmed hardware computer system comprises a server of an Internet website visited by the second Internet-accessing online device; and (iii) the profile information associated with the first Internet-accessing online device comprises behavioral profile information derived from online activity performed with the first Internet-accessing online device.

* * * * *